United States Patent [19]

Miyakoshi et al.

[11] Patent Number: 4,744,434
[45] Date of Patent: May 17, 1988

[54] WHEEL SUSPENSION SYSTEM FOR MOTORCYCLES

[75] Inventors: Shinichi Miyakoshi; Kazuhiko Tsunoda, both of Saitama, Japan

[73] Assignee: Honda Giken Kogyo Kabushiki Kaisha, Tokyo, Japan

[21] Appl. No.: 382,101

[22] Filed: May 26, 1982

[30] Foreign Application Priority Data

| May 26, 1981 | [JP] | Japan | 56-79775 |
| Jul. 20, 1981 | [JP] | Japan | 56-114122 |
| Aug. 14, 1981 | [JP] | Japan | 56-120854[U] |
| Aug. 14, 1981 | [JP] | Japan | 56-120855[U] |
| Aug. 20, 1981 | [JP] | Japan | 56-130807 |

[51] Int. Cl.$^4$ .............. B62K 25/04; B62K 25/12; B62K 25/24; B62K 25/26
[52] U.S. Cl. ................... 180/219; 180/227; 267/273; 280/276; 280/279; 280/284; 280/288
[58] Field of Search ............. 280/276, 277, 283–288; 267/273; 180/219, 227

[56] References Cited

U.S. PATENT DOCUMENTS

| 2,401,869 | 6/1946 | Halliday | 280/286 |
| 3,907,332 | 9/1975 | Richardson | 280/285 |
| 4,360,214 | 11/1982 | Isono | 280/284 |

FOREIGN PATENT DOCUMENTS

| 893384 | 1/1944 | France | 280/276 |
| 933079 | 12/1947 | France | 280/284 |
| 109494 | 9/1917 | United Kingdom | 280/283 |
| 161054 | 4/1921 | United Kingdom | 280/283 |
| 529305 | 11/1940 | United Kingdom | 280/285 |
| 562169 | 6/1944 | United Kingdom | 280/285 |
| 562686 | 7/1944 | United Kingdom | 267/57 |

*Primary Examiner*—John J. Love
*Assistant Examiner*—Mitchell J. Hill
*Attorney, Agent, or Firm*—Irving M. Weiner; Joseph P. Carrier; Pamela S. Burt

[57] ABSTRACT

A wheel suspension system for a motorcycle including a relatively stable member and a swingable member swingably connected with the stable member and supporting thereon a road wheel. The wheel suspension system comprises at least one torsion bar arranged on the stable member, a force transmission route adapted to transmit forces acting thereon, the force transmission route being connected with the swingable member and the torsion bar, and a lever type damper having an operation shaft adapted to provide damping forces when rotated, the operation shaft being engaged with the force transmission route.

The system is substantially free from restrictions with respect to configuration and damping force producing direction.

3 Claims, 23 Drawing Sheets

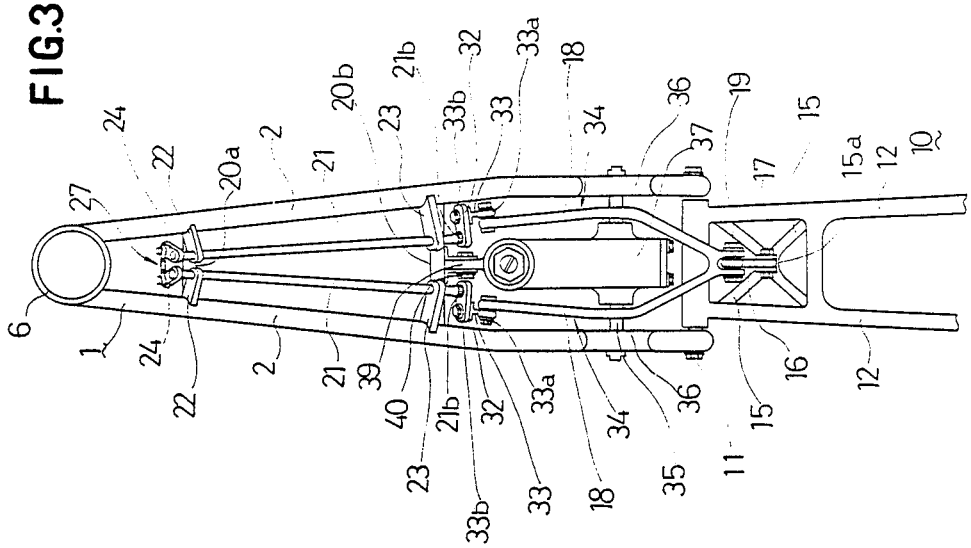
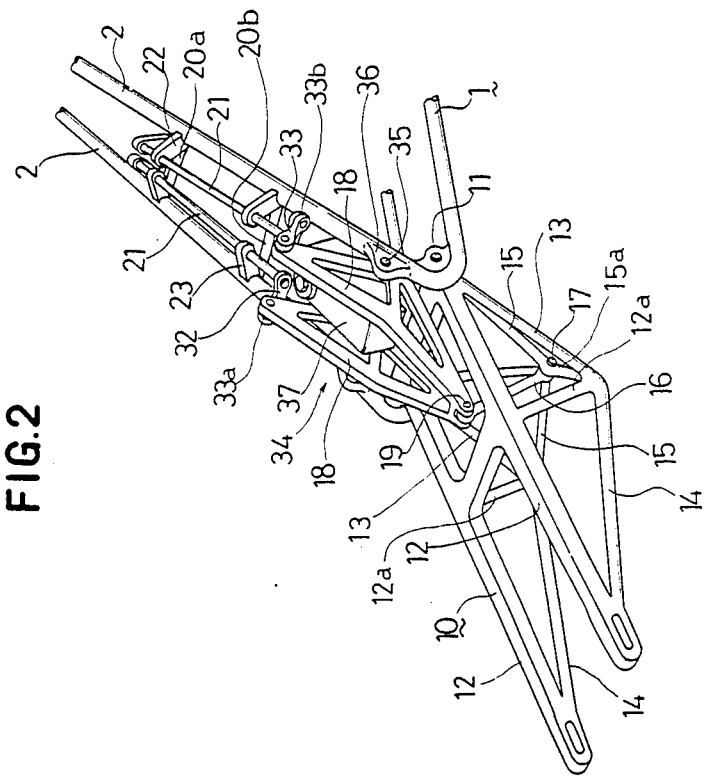

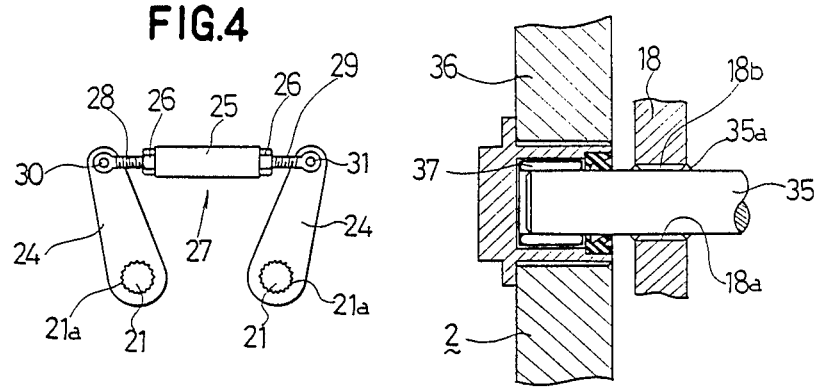
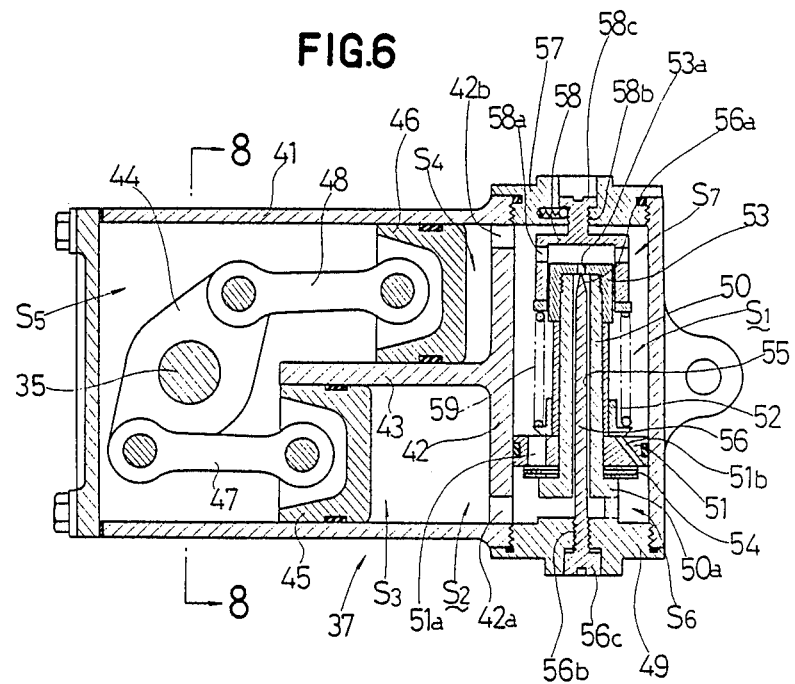

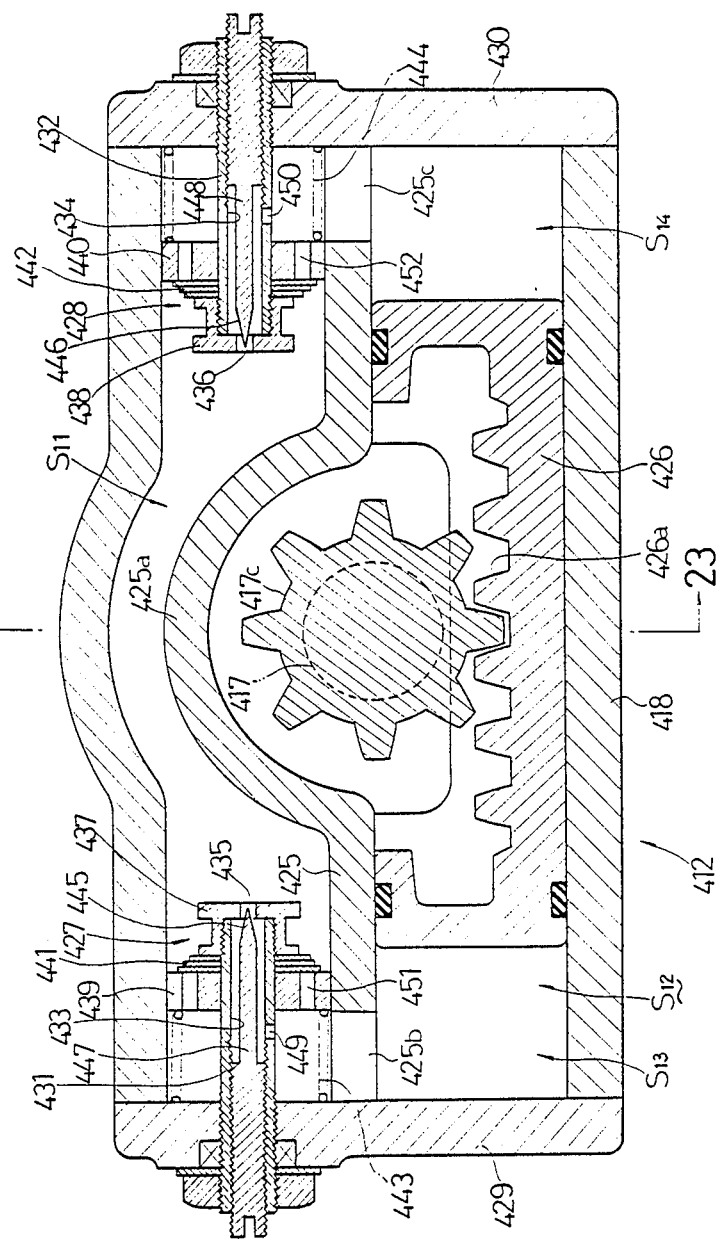

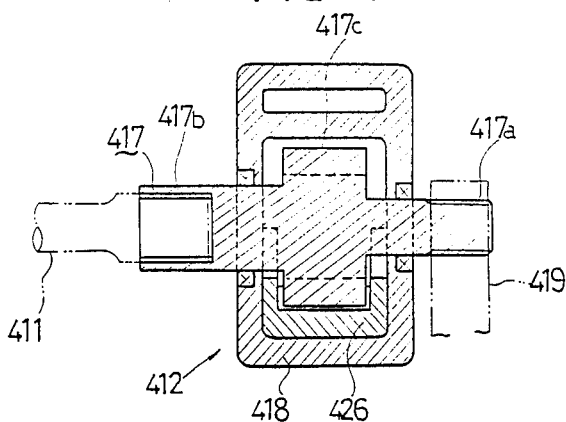
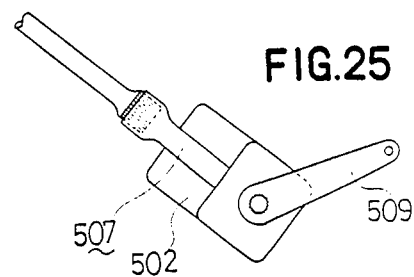
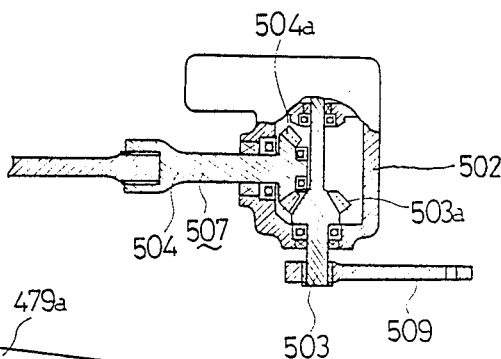
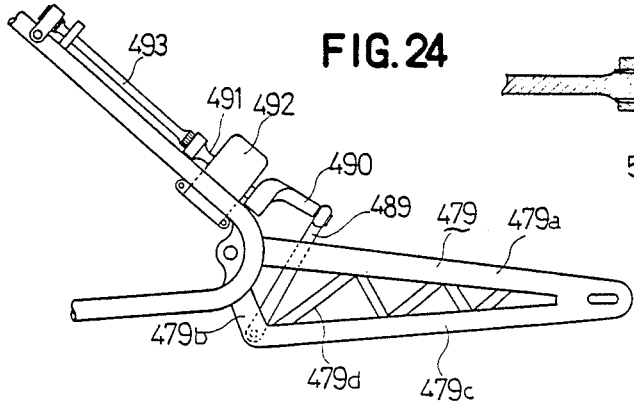
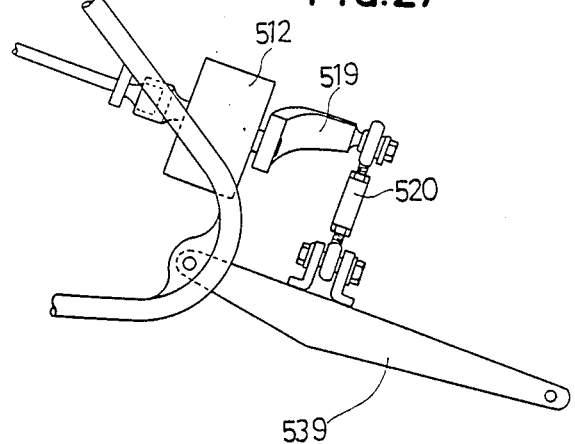

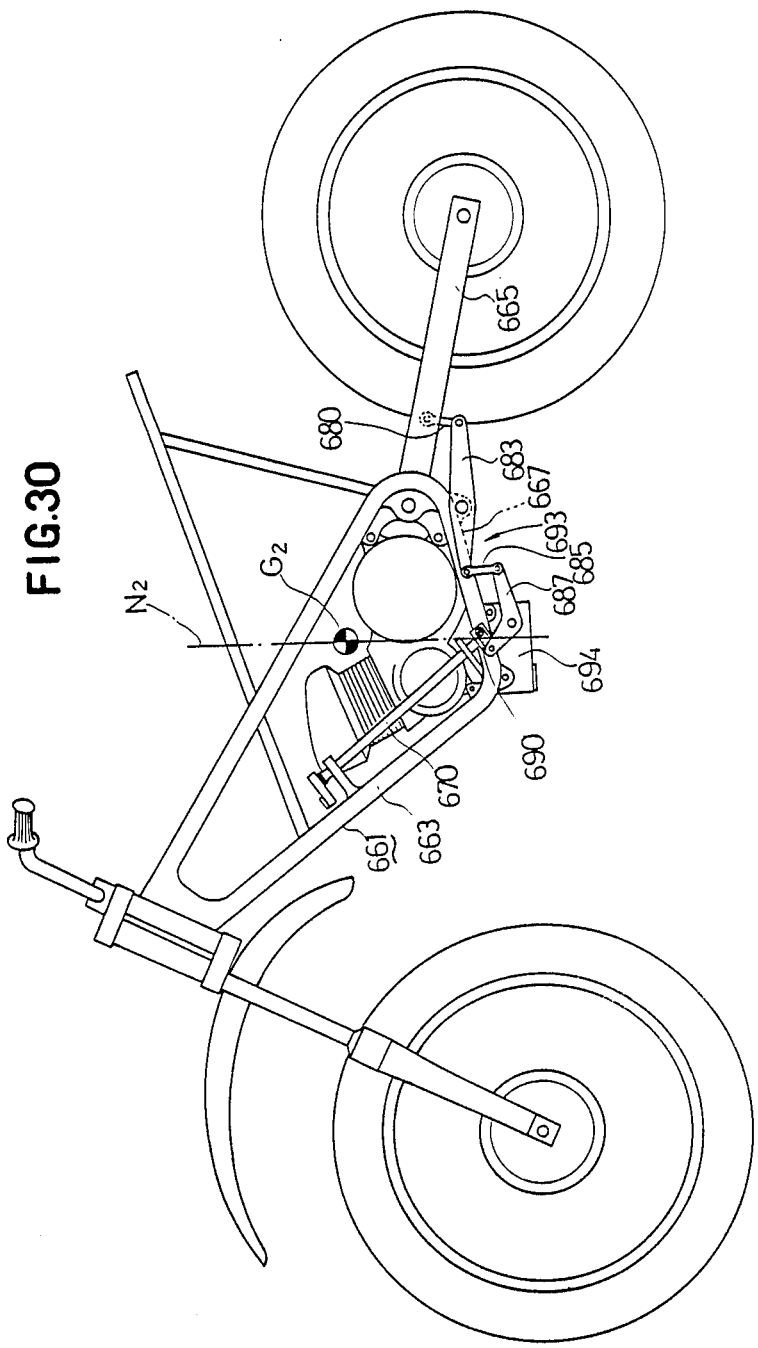

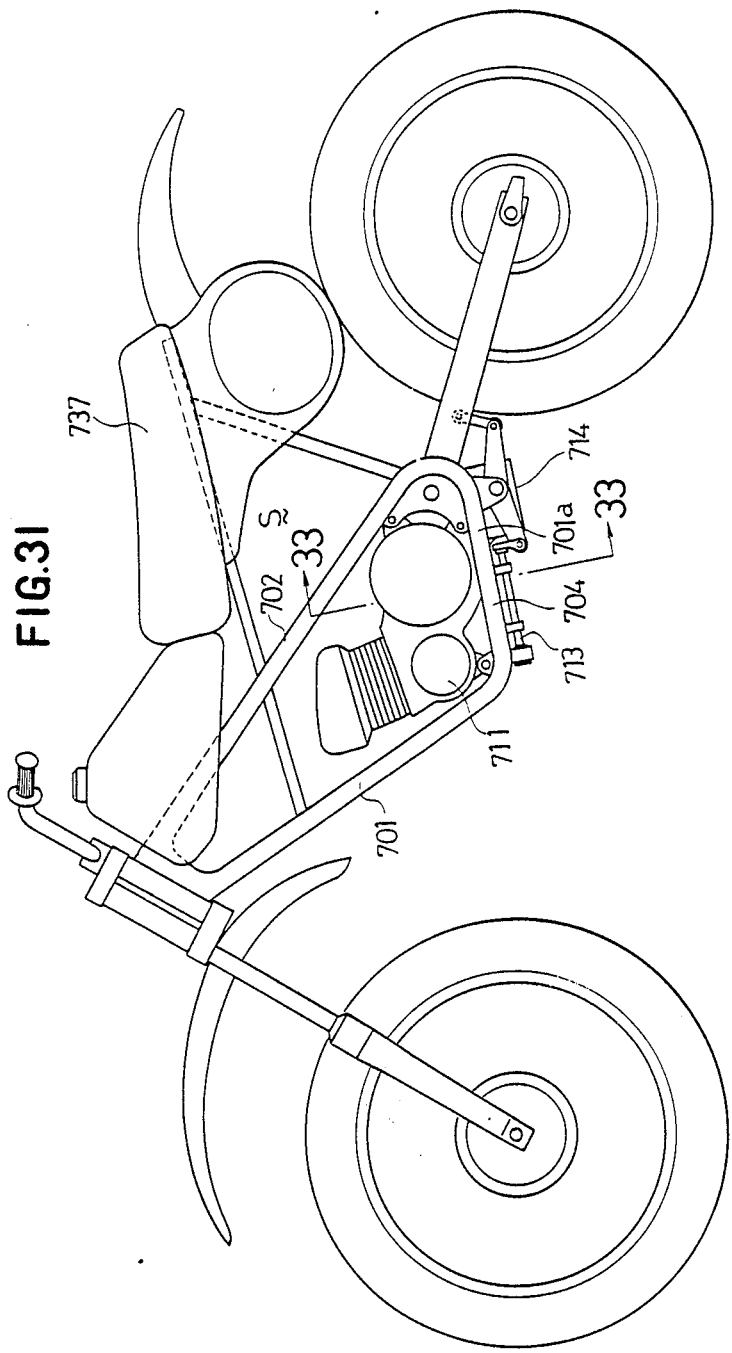

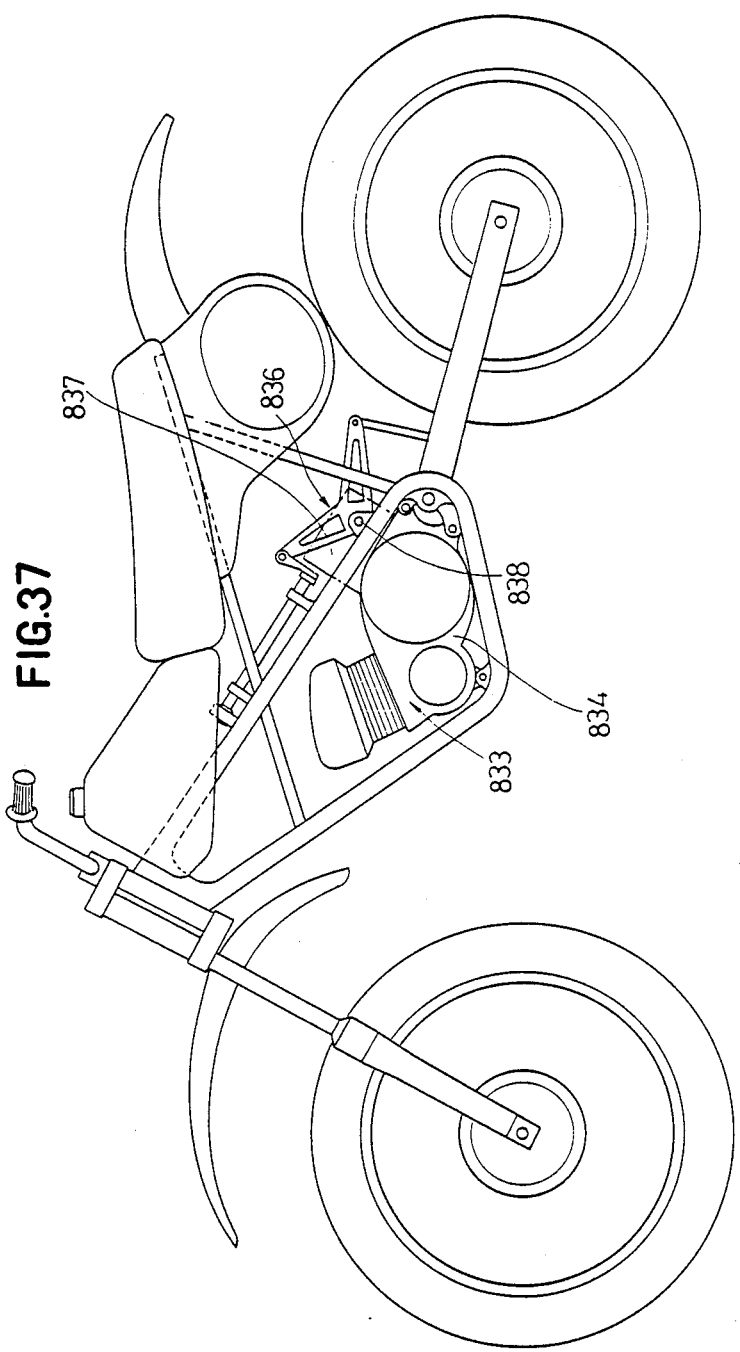

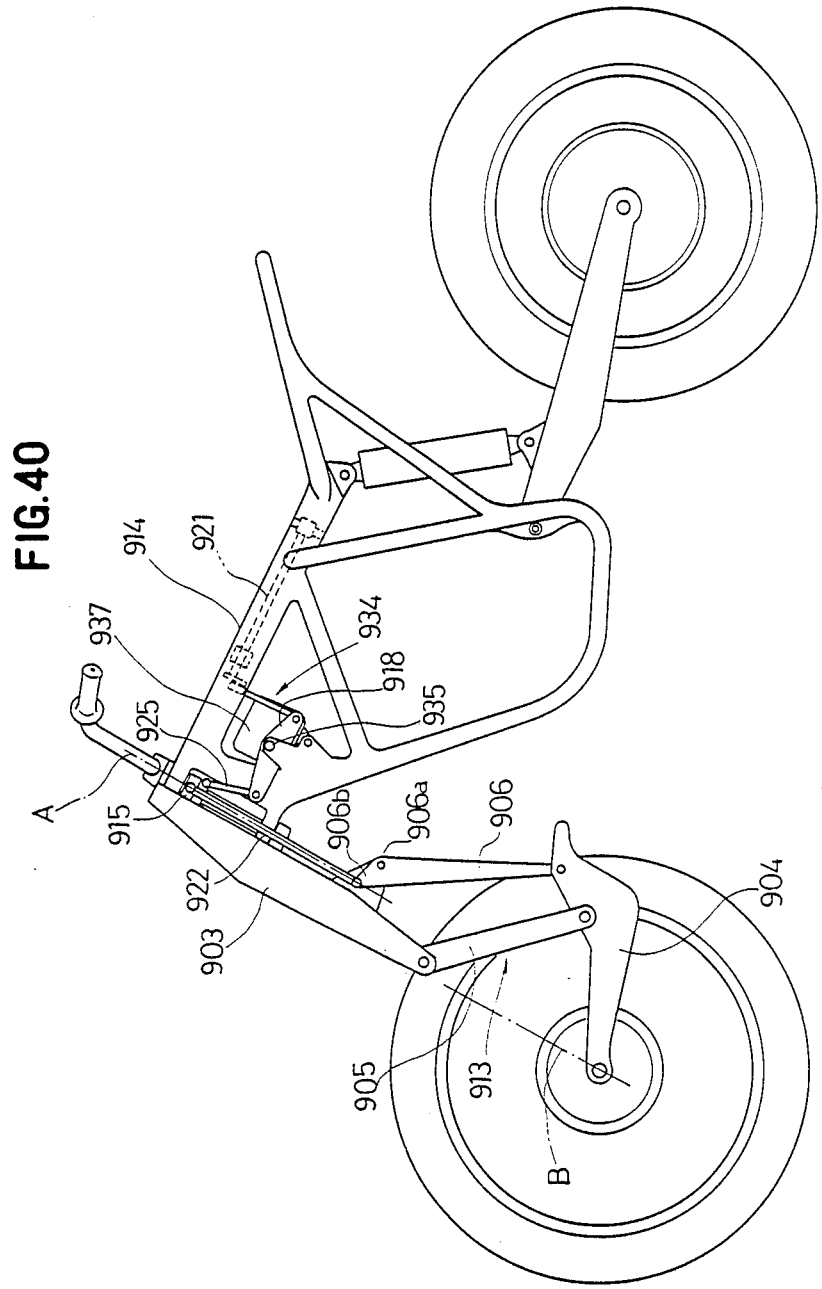

WHEEL SUSPENSION SYSTEM FOR MOTORCYCLES

BACKGROUND OF THE INVENTION

1. Field of the Invention

The present invention relates to a wheel suspension system for motorcycles and particularly to a wheel suspension system for motorcycles in which a damping mechanism is interposed between a stable member and a swingable member supporting a road wheel.

2. Description of Relevant Art

In the art of motorcycles, there have been proposed wheel suspension systems including a stable member such as a vehicle frame, a swingable member connected with the stable member such as a rear fork supporting thereon a road wheel such as a rear wheel and a damping mechanism interposed between the stable and swingable members, in which the damping mechanism comprises a hydraulic damper of a telescopic type and a coil spring fitted on the damper, the hydraulic damper and the coil spring cooperating with each other to produce damping forces against vertical movements of the road wheel.

In such conventional wheel suspension system, a damping mechanism has the confriguration and damping force producing direction thereof substantially restricted by a telescopic damper of a substantially tubular form, thus being restricted in design and arrangement to a considerable degree.

The present invention overcomes such problems in conventional wheel suspension systems for motorcycles.

SUMMARY OF THE INVENTION

The present invention provides a wheel suspension system for a motorcycle including a relatively stable member and a swingable member swingably connected with the stable member and supporting thereon a road wheel, comprising at least one torsion bar arranged on the stable member, a force transmission route adapted to transmit forces acting thereon, the force transmission route being connected with the swingable member and the torsion bar, and a lever type damper having an operation shaft adapted to provide damping forces when rotated, the operation shaft being engaged with the force transmission route.

An object of the present invention is to provide a wheel suspension system for a motorcycle including a relatively stable member, a swingable member connected with the stable member and supporting thereon a road wheel and a damping mechanism interposed between the stable and swingable members. The suspension system is substantially free from restrictions with respect to the configuration and damping force producing direction thereof, thus being substantially free from restrictions in design and arrangement.

BRIEF DESCRIPTION OF THE DRAWINGS

FIG. 2 is an enlarged perspective view of the wheel suspension system of FIG. 1.

FIG. 3 is an enlarged plan view of the wheel suspension system of FIG. 1.

FIG. 4 is an enlarged sectional view showing a bearing portion of a main shaft of a lever type damper of the wheel suspension system of FIG. 1.

FIG. 5 is an enlarged elevational view of a preload adjusting mechanism of a pair of torsion bars of the wheel suspension system of FIG. 1.

FIG. 6 is an enlarged longitudinal sectional view of the lever type damper of the wheel suspension system of FIG. 1.

FIG. 22 is an enlarged transverse sectional view of a lever type damper of the wheel suspension system of FIG. 20.

FIG. 23 is a sectional view taken along line 23—23 in FIG. 22.

FIG. 24 is a side view of a wheel suspension system according to a fourteenth embodiment of the invention.

FIG. 25 is a side view of a lever type damper of a wheel suspension system according to a fifteenth embodiment of the invention.

FIG. 26 is a partially sectional top view of the lever type damper of FIG. 25.

FIG. 27 is a side view of a wheel suspension system according to a sixteenth embodiment of the invention.

FIG. 30 is a side view of a motorcycle including a wheel suspension system according to an eighteenth embodiment of the invention.

FIG. 31 is a side view of a motorcycle including a wheel suspension system according to a nineteenth embodiment of the invention.

FIG. 37 is side view of a motorcycle including a wheel suspension system according to a twenty-second embodiment of the invention.

FIG. 40 is a side view of a motorcycle including a twenty-third embodiment of the invention.

DETAILED DESCRIPTION OF PREFERRED EMBODIMENTS

Figure 1:
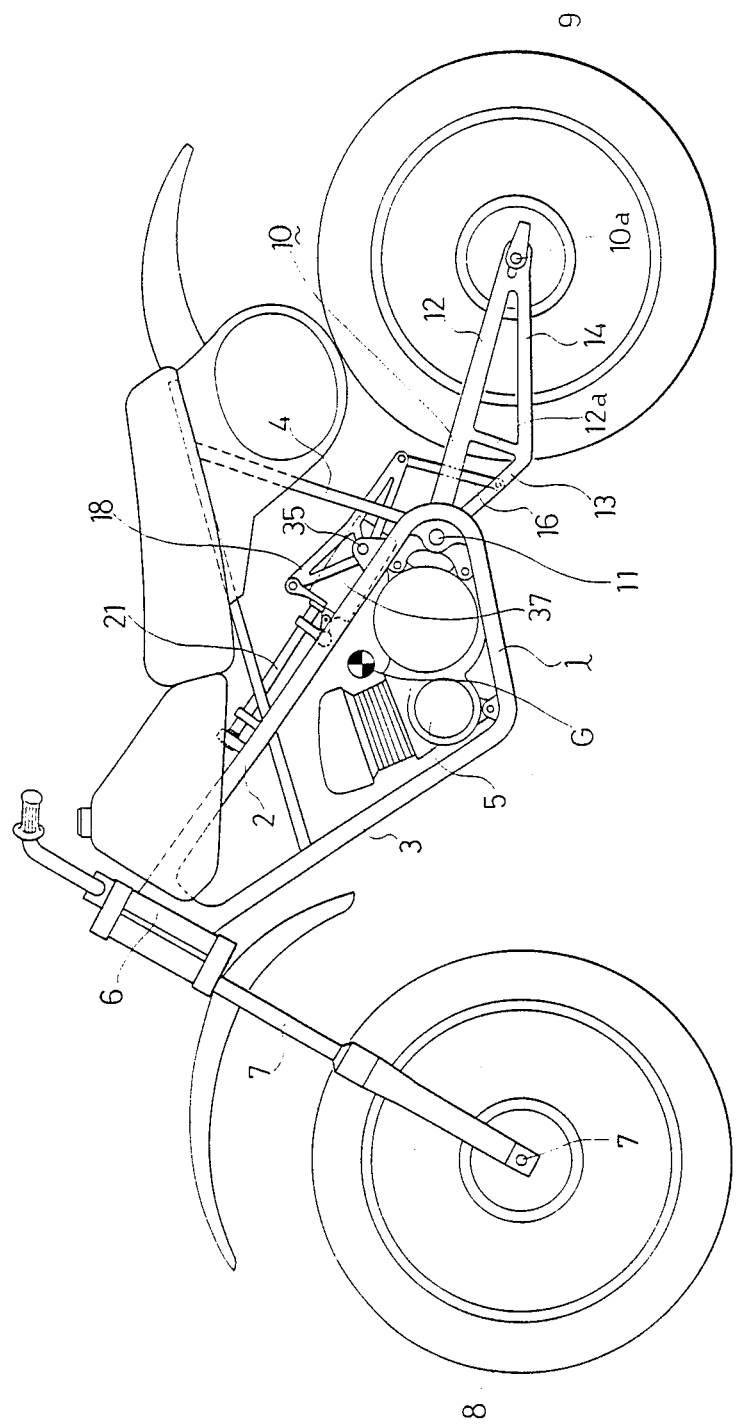
FIG. 1 is a side view of a motorcycle including a wheel suspension system according to a first embodiment of the invention.

Referring first to FIGS. 1 to 3, generally designated at reference character 1 is a vehicle frame as a relatively stable member of the motorcycle. The frame 1 comprises, as well known, a pair of main frame members 2, 2, a pair of down tubes 3, 3, a reinforcing frame member 4 and the like and having an engine 5 mounted to be disposed as illustrated in FIG. 1. The frame 1 has secured at the front end thereof a head pipe 6 by which a front fork 7 of a telescopic type is transversely pivotably held to serve as a front wheel suspension system for supporting at the lower end thereof a front wheel 8 by means of an axle 7a. On the other hand, a rear wheel 9 is supported by a rear fork 10 also by means of an axle 10a, the rear fork 10 having the front end thereof vertically swingably connected by a pivot shaft 11 to the frame 1, thus serving as a swingable member for supporting the rear wheel 9.

As shown in FIGS. 2 and 3, the rear fork 10 comprises a pair of left and right base frames 12, 12 extending substantially longitudinally and respectively paired front and rear sub-frames 13, 13 and 14, 14 extending obliquely downwardly from the respective front and rear ends of the base frames 12, 12 to be joined at the lower ends thereof with each other, thereby forming a pair of left and right truss structures turned downwardly and further respectively reinforced by a pair of sub-members 12a, 12a extending substantially vertically. Extended from the respective upper and lower ends of the front sub-frames 13, 13 are downwardly obliquely inwardly extending frames 15 converged at the lower ends thereof into a single joint portion 15a with which the lower end of a substantially vertical rod 16 is pivotably connected by means of a pin 17. The upper end of the rod 16 is connected with a frontwardly forked pair of left and right substantially triangular link members 18, 18 so as to be pivotable about a pin 19 provided through a single rear end portion as a rearwardly converged portion of the link members 18, 18 comprising a single and integral member as forked at the rear end thereof.

As shown in FIGS. 1 and 3 the pair of left and right main frame members 2, 2 are extended rearwardly from the head pipe 6 and connected with each other through front and rear cross frame members 20a, 20b. Disposed so as to be extended respectively along the main frame members 2, 2 are a pair of left and right torsion bars 21, 21 which are rotatably supported at the respective front and rear end portions thereof with respective pairs of front and rear guide members 22, 23 projecting from the main frame members 2, 2.

Referring now to FIG. 4, the torsion bars 21, 21 have the front ends thereof formed with serrations 21a, 21a, respectively, engaged to be fitted in the base ends of a pair of left and right adjustment arms 24, 24, respectively. The left and right adjustment arms 24, 24 have the distal ends thereof pivotally connected with the outer ends of left and right threaded rods 28, 29 by means of left and right pins 30, 31, respectively, the rods 28, 29 defining, together with a tubular nut 25 and a pair of left and right lock nuts 26, 26, a turnbuckle 27 which is adjustable in length. As the entire length of the turnbuckle 27 is made larger by rotating the nut 25, the torsion bars 21, 21 will be twisted respectively outwardly together with the adjustment arms 24, 24 and inwardly as the length becomes smaller, so that the torsion bars 21, 21 are adjustable with respect to the preload.

Referring again to FIGS. 1 and 3, the left and right torsion bars 21, 21 have the rear ends thereof also formed with serrations 21b, 21b, respectively, inserted to be secured to the respective inner ends of a pair of left and right link arms 32, 32 disposed symmetrically to extend respectively outwardly substantially in the transverse direction of the motorcycle. The left and right link arms 32, 32 have the outer ends thereof operatively connected with the front ends of the left and right link members 18, 18 through a pair of left and right longitudinal rods 33, 33, respectively, by means of rear and front pairs of ball joints 33a, 33a and 33b, 33b pivotably interconnecting the link members 18, 18 with the longitudinal rods 33, 33 and the rods 33, 33 with the link arms 32, 32, respectively.

As will be understood from the foregoing description, the rear fork 10 is operatively connected with either of the left and right torsion bars 21, 21 by means of a linkage 34 comprising the single vertical rod 16, either of the paired link members 18, 18, either of the paired longitudinal rods 33, 33 and either of the paired link arms 32, 32. Thus, with respect to a longitudinal center line of the motorcycle, there is provided on the left and right either of a pair of the linkages 34, 34 including the rod 16 as a common link member thereof and the pair of link members 18, 18 vertically rotatable about a single support shaft 35 as a common axis of rotation thereof.

Referring now to FIG. 5, the support shaft 35 has both ends thereof rotatably supported in either of a pair of bearing boss portions 36, 36 formed in the left and right main frame memberss 2, 2, by means of a needle bearing 37.

The support shaft 35 is further formed on its outer circumference near each end thereof with outer teeth 35a engaged with inner teeth 18b formed on the inner circumference of a hole 18a opened through either of the link members 18, 18, so that the support shaft 35 is interlocked to be rotatable integrally with the link members 18, 18.

Description will be continued hereinbelow again with reference to FIGS. 1 to 3.

Between the pair of left and right linkages 34, 34, particularly between the pair of link members 18, 18, there is interposed a damper 37 of a rotatable lever type which has the support shaft 35 as the operation shaft thereof adapted to produce damping forces when rotated, while the damper 37 may be of a piston type or a blade type. The above arrangement enables the damper 37 to be effectively protected by the link members 18, 18 and to be disposed in line with a central longitudinal axis of the motorcycle, thus being favorable with respect to the balancing of vehicle weight. Moreover, when the pair of link members 18, 18 are caused to rotate, their respective rotating forces will be evenly extered on the left and right of the damper 37, which is also favorable with respect to the loading balance. Further, because the support shaft 35 of the link members 18, 18 itself serves as the rotatable operation shaft or a main shaft of the lever type damper 37, it is possible when the link members 18, 18 rotate to input their rotating forces directly into the damper 37, thus permitting the mechanical strength to be increased along the related tranmission mechanism of the rotating force actuating the damper 37.

The damper 37 is integrally provided at the front end thereof by means of a fixing flange 39 secured with a bolt 40 to the rear cross frame member 20b, thus being prevented from rotating when the rotating force is input.

As described above, the rear fork 10 is connected with either of the torsion bars 21, 21 through a force transmission route comprising the linkage 34 and in this embodiment, the force transmission route is connected in parallel relation with the damper 37. Thus, the damper 37 is not placed in series in any route operatively connecting the rear fork 10 with either of the torsion bars 21, 21, while being simply engaged or additionally connected with the force transmission route.

Figure 7:
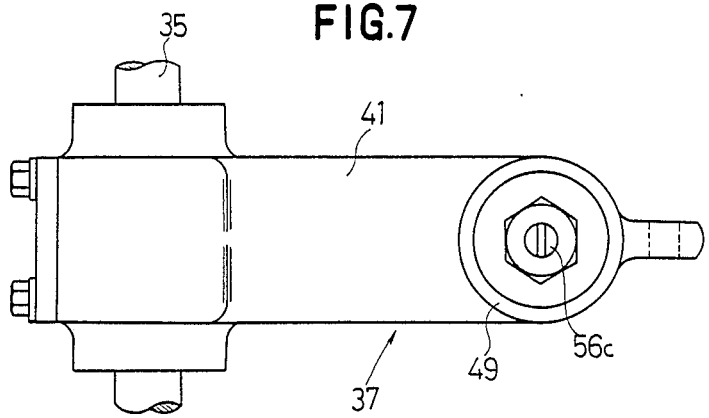
FIG. 7 is a plan view of the lever damper of FIG. 6.
Figure 8:
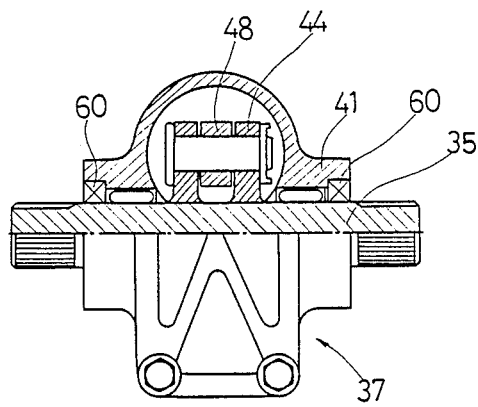
FIG. 8 is a sectional view taken along line 8—8 in FIG. 2.

Referring now to FIGS. 6 to 8, the interior of a casing 41 of the lever type damper 37 having enclosed therein oil filled via an oil port (not shown) and now closed is divided by a vertical wall 42 into a damping force generating chamber $S_1$ and a damping force outtake chamber $S_2$. The chamber $S_2$ has therein a horizontal wall 43 which is relatively short with respect thereto and adapted to define the upper and lower sides of lower and upper piston chambers $S_3$, $S_4$, respectively, which communicate with the chamber $S_1$, by means of through holes 42a, 42b, respectively and constituting the chamber $S_2$ together with a rear chamber $S_5$ having the operation shaft 35 transversely provided therethrough. In the rear chamber $S_5$, there is disposed a piston arm 44 seated and secured at the central portion thereof on and to the operation shaft 35 and operatively connected at the lower and upper end portions thereof with lower and upper pistons 45, 46 slidably fitted in the lower and upper chambers $S_3$, $S_4$ through lower and upper connecting cords 47, 48, respectively.

On the other hand, in the damping force generating chamber $S_1$, there is inserted a tubular guide 50 forming an integral part of a lower lid 49 threadedly secured to the damper casing 41. The guide 50 has near the base end thereof a disk-like member 51 and a slide value 52 fitted thereon fixedly and slidably, respectively, and at its distal end thereof a cap 53 threadedly secured thereto. Interposed between the disk-like member 51 and a flanged base portion 50a of the guide 50 are a plurality of laminated spring plates forming a plate valve 54 fitted on the guide 50. The disk-like member 51 is adapted to separate the damping force generating chamber $S_6$, $S_7$ into lower and upper chambers S6, S7, while being formed therethrough with at least one vertical orifice 51a normally stopped at the lower end thereof by the plate valuve 54 and with at least one inclined valve also normally stopped at the upper end thereof by the slide valve 52, to thereby allow the lower and upper chambers $S_6$, $S_7$ to communicate with each other as circumstances require. Threadedly fitted in the lid 49 is a base portion of a needle 56 which has the upper portion thereof freely inserted in an inner path 55 of the guide 50 and its tapered distal end portion 56a facing an orifice 53a formed through the cap 53. The damper casing is provided on the upper side thereof with another lid 57 threadly secured thereto, which lid 57 has threadedly attached thereto and inserted therethrough a counter member 58 for holding from the upper side a valve spring 59 interposed between the slide valve 52 and the counter member 58, thus normally exerting a resilient force upon the slide valve 52 to thereby stop the orifice 51b. The counter member 58 is formed with a hollow portion freely or slidably fitted on the cap 53 and provided through the side wall thereof with a plurality of communication holes 58a.

With the above construction, when the operation shaft 35 is rotated counterclockwise in FIG. 6, the lower piston 45 is to advance, causing oil in the lower piston chamber $S_3$ to run through the hole 42a, the path 55, the orifice 53a, the holes 58a and the holes 42b into the upper piston chamber $S_4$ with flow rates corresponding to an open area of the orifice 53a as reduced by the insertion of the tapered portion 56a of the needle 56, thus receiving damping forces due to the reducing effect at the orifice 53a.

The needle 56, which has a threaded portion 56b threaded into the lid 49 as before described above mentioned, is provided at the lower end thereof with an operable portion 56c exposed to the outside for thereby permitting, by way of the rotating cooperation thereof, the needle 56 to be adjusted to advance and retreat, so that the degree of flow turndown and the strength of damping are adjustable by varying the open area of the orifice 53a.

In the above description, if where the operation shaft 35 is rotated at relatively high speeds, the lower piston 45 moves rapidly to impress high pressures to the oil, thus rendering relatively large oil pressures exerting through the orifice 51b upwardly to the slide valve 52. The slide valve will retreat against the valve spring 59, thus causing the flow rate of oil running from the lower chamber $S_3$ to the upper chamber $S_4$ during high speed rotation of the shaft 35 to be increased by the amount of oil passing the orifice 51b, thereby favorably generating damping forces in response to the speed of rotation of the operation shaft 35. Further, the resilient force of the valve spring 59 is adjustable with the counter member 58 screwed at the threaded portion thereof 58b thereof so as to be capable of advance and retreat movements by driving the operating portion 58c thereof, thus permitting a voluntary setting of a rotating speed of the operation shaft 35 at which the slide valve 52 starts retreating to thereby open the orifice 51b.

On the contrary, when the operation shaft 35 is rotated clockwise in FIG. 6, the upper piston 46 is advanced, causing oil in the upper piston chamber S4 to flow through the hole 42b, the holes 58a, the orifice 53a, the path 55 and the hole 42a into the lower piston chamber S3 with flow rates also corresponding to an open area of the orifice 53a determined by the position on the tapered portion 56a of the needle 56 adjustable for advance and retreat movements thereof by driving the operating portion 56c. Moreover, as oil pressure of the chamber S7, increases, the plate valve will yield to be deformed downwardly with the oil exerting through the orifice 51a upon the plate valve 54, thus permitting the oil to flow via both the orifices 51a, 53a, thereby causing the damper 37 to generate damping forces in response to the flow rate of oil.

As will be understood from the foregoing, when the rear fork 10 is caused to swing upwardly about the pivot shaft 11, thereby permitting the rear fork to move upwardly following undulations of the road, the rod 16 will correspondingly rotate the link members 18, 18, thereby causing the operation shaft 35 to rotate, so that the damper 37 generates damping forces in response to the upward movement of the rear wheel 9. In this case, the operation shaft 35 is to rotate counterclockwise in FIG. 6 while generating damping forces. Further, with the rotation of the link members 18, 18, the torsion bars 21, 21 will be twisted with loads applied through the rods 33, 33 and the link arms 32, 32, the loads also serving as damping forces against the rear wheel 9. On the contrary, if the rear fork 10 is caused to swing downwardly to thereby permit the rear wheel 9 to go down, the link members 18, 18 and the operation shaft 35 rotate vice versa, while the damper 37 is functionable in both rotating directions as mentioned above and capable of generating damping forces in this case also. As a result, the operation shaft, 35 returns to the initial or neutral position thereof, while generating damping forces, due to reactive restoring energy which has been reserved in the torsion bars 21, 21 during the upward swing of the rear fork 10.

Moreover, by properly presetting mounting angles of the link arms 32, 32 with respect to the corresponding torsion bars 21, 21, it is possible to render the twist angle of the torsion bars 21, 21 for a unitary amount of the movement of the rear wheel 9 relatively small within a relatively small swinging angle range of the rear fork 10, i.e. to soften or weaken the spring force of torsion bars 21, 21 against the movement of the rear wheel 9, and larger as the swinging angle of the rear fork 10 increases, i.e. to harden or strengthen the spring force of the torsion bars 21, 21 against the movement of the rear wheel 9, so as to obtain a progressive characteristic in which the damping force due to the torsion bars 21, 21 increases in a curved relation with respect to the amount of movement of the rear wheel 9.

Further, the pair of left and right torsion bras 21, 21 are twisted in opposite directions with respect to each other as the link members 18, 18 rotate, thus enabling twist reaction forces of the torsion bars 21, 21 as exerted on the vehicle frame 1 to act in an offsetting direction. Furthermore, the linkk members 18, 18 are adapted to concurrently serve as rotatable lever members of the lever type damper 37, thus effectively reducing the number of components. Still more, the preload of the torsion bars 21, 21 is adjustable with a preload adjusting mechanism comprising the turnbuckle 27, thereby allowing the spring force of the torsion bars 21, 21 to be changed.

In addition to the above, it is substantially unnecessary to change the longitudinal size of the lever type damper 37 according to the allowable amount of swinging of the rear fork 10, which otherwise has been required particularly when employing telescopic dampers. Therefore, it is now possible to use dampers of the same type or model for various motorcycles having different allowable amounts of swinging of the rear fork. Still more, the rear fork 10 is substantially free from the weight of the torsion bars 21, 21 and the damper 37, thus permitting what is referred to as "sprung weight" to be favorably reduced. Still further, as shown in FIG. 8, the damper 37 requires at the bearing portions thereof no more than a pair of seal members 60, 60 which are not of a sliding seal type but of a rotating seal type which does not substantially affect the damping force of the damper 37.

As will be easily understood, the rear fork 10 and either of the torsion bars 21, 21 may be operatively connected with each other through a selective type of linkage including the above-described type, so that the torsion bars 21, 21 and the damper 37 may be disposed at any desirable positions with respect to the vehicle frame by using a proper type of linkage, which will greatly increase the degree of freedom in design. Particularly, according to this embodiment in which the torsion bars 21, 21 and the damper 37 are favorably arranged near a center of gravity G of the motorcycle existing in the vicinity of the engine 5 as shown in FIG. 1, the moment of inertia about the center of gravity G can be effectively reduced. Moreover, the damper 37 is disposed near a vehicle frame portion having the rear fork 10 swingably connected thereto and being generally provided with an extremely large strength, thereby achieving a favorable arrangement of the damper 37 which is subjected to relatively large loads while generating the damping force. Further, the torsion bars 21, 21 are straight linear members and hence may be arranged along component members of the vehicle frame 1 having likewise straight linear shapes. Such an arrangement is also possible even when using torsion bars of different lengths to thereby obtain a favorable spring force characteristic. Still further, the spring force to be produced when the torsion bars 21, 21 are twisted may be changed by varying the entire length of the torsion bar itself, so that desired spring forces are easily obtainable.

Figure 9:
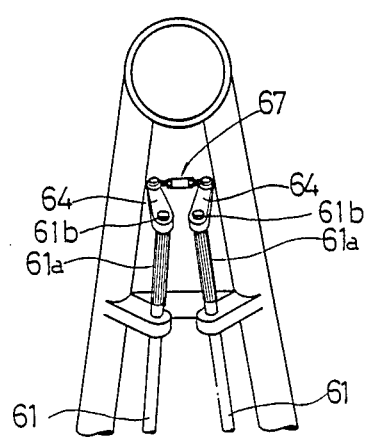
FIG. 9 is a plan view showing a preload adjustment mechanism of a pair of torsion bars of a wheel suspension system according to a second embodiment of the invention.
Figure 10:
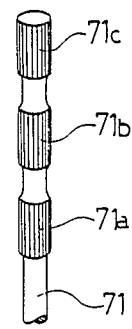
FIG. 10 is an explanatory view showing a fixed end portion of a torsion bar of a wheel suspension system according to a third embodiment of the invention.

Referring now to FIGS. 9 and 10 there are shown the wheel suspension systems for motorcycles according to the second and third embodiments of the invention, respectively, which without changing a torsion bar(s) can provide effects substantially similar to those obtainable by using different torsion bars to thereby change the length. In FIG. 9 is a pair of torsion bars 61 having along the front end portions thereof serrations 61a, 61a formed thereon so as to have a relatively long dimension, thereby permitting a pair of adjustment arms 64, 64 as well as a turnbuckle 67 adapted to slide for adjustment in respective axial directions of the torsion bars 61, 61, the adjustment arms 64, 64 being fitted on either of respective engagement positions 61b, 61b of the serrations 61a, 61a. The engagement positions 61b, 61b concurrently serve as respective fixed ends of the torsion bars 61, 61 with respect to twisting movements of the latter. Accordingly, the torsion bars 61, 61 have the length thereof substantially variable with the sliding adjustment of the arms 64, 64.

In FIG. 10, designated at reference character 71 is a torsion bar. The torsion bar 71 is formed uncontinuously along the front portion thereof with three serrations 71a, 71b, 71c, thereby enabling an adjustment arm (not shown) to be shifted in a step-by-step manner.

Figure 11:
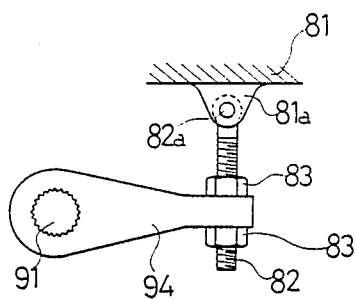
FIG. 11 is an elevational view of a preload adjusting mechanism of a torsion bar of a wheel suspension system according to a fourth embodiment of the invention.

Referring now to FIG. 11, designated by reference numberal 81 is a vehicle frame of a motorcycle (not shown). The frame 81 has secured thereto a bracket 81a supporting a threaded rod 82 pivotally connected thereto at one end thereof by means of a pin 82a. The rod 82 is fitted in and fixed by a pair of lock nuts 83, 83 to the distal end of an adjustment arm 94 having the base end thereof fixedly fitted on a torsion bar 91. The torsion bar 91 has a preload which is adjustable by rotating the adjustment arm 94 after loosening the lock nuts 83, 83 and, at the rotated position, by fixing the arm 94 to the rod 82 with the lock nuts 83, 83. The preload of the torsion bar 91 will increase and decrease in response to the rotation of the arm 94.

Figure 12:
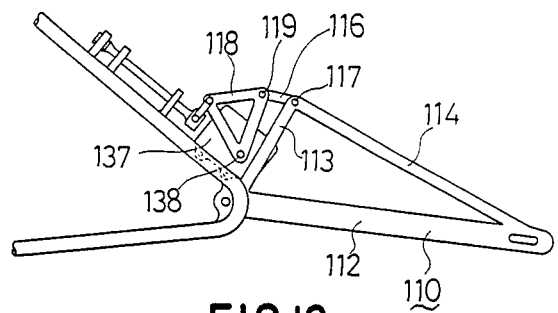
FIG. 12 is a side view of a wheel suspension system according to a fifth embodiment of the invention.

Referring now to FIG. 12, generally designated by reference numeral 110 is a rear fork comprising on either traverse side thereof a base frame 112 and front and rear sub-frames 113, 114 extending upwardly obliquely, thereby forming a truss structure in an upward direction. The sub-frames 113, 114 have a common top joint portion connected with the rear end of a rod 116 by means of a pin 117. The front end of the rod 116 is connected by means of a pin 119 with the upper rear corner of a triangular link member 118 secured to the shaft 138 of a lever type damper 137.

Figure 13:
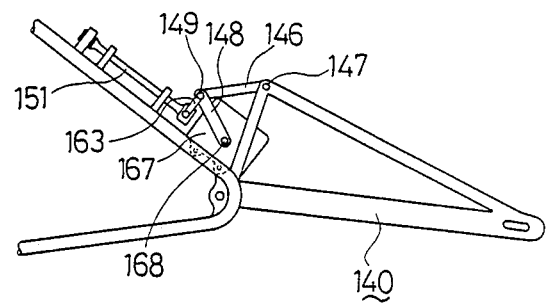
FIG. 13 is a side view of a wheel suspension system according to a sixth embodiment of the invention.

Referring now to FIG. 13, generally designated by reference numeral 140 is a rear fork havving on either transverse side thereof a truss structure directed upwardly as in the fifth embodiment of the invention. As illustrated, a link member 148 is provided as a straight linear member having the base end thereof secured to an operation shaft 168 of a lever type damper 167; and the front end of a rod 146 connected at the rear end thereof with the rear fork 140 by means of a pin 147 is operatively connected by means of a joint member 149 with the distal end of the link member 148 as well as the upper end of a rod 163 having the lower end thereof connected to a torsion bar 151. In this manner, the rods 146, 163 are both connected by means of a single common member with the distal end of the link member 148.

Figure 14:
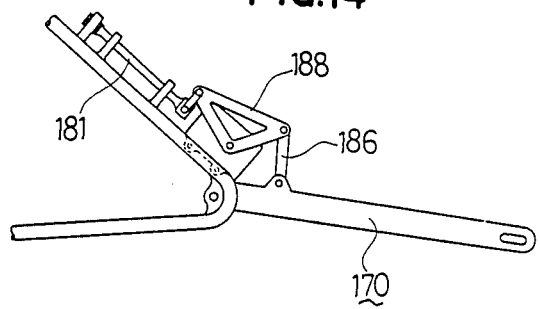
FIG. 14 is a side view of a wheel suspension system according to a seventh embodiment of the invention.

Referring now to FIG. 14, generally designated by reference numeral 170 is a rear fork of a known type having a straight linear configuration. The rear fork 170 is operatively connected with a torsion bar 181 through a rod 186 and a triangular link member 188 similar to the fifth embodiment of the invention.

Figure 15:
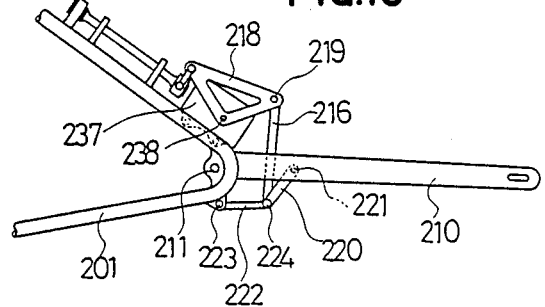
FIG. 15 is a side view of a wheel suspension system according to an eighth embodiment of the invention.
Figure 16:
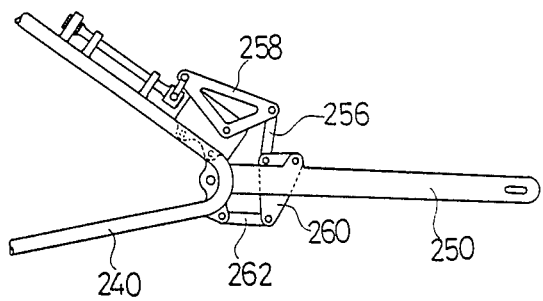
FIG. 16 is a side view of a wheel suspension system according to a ninth embodiment of the invention.
Figure 17:
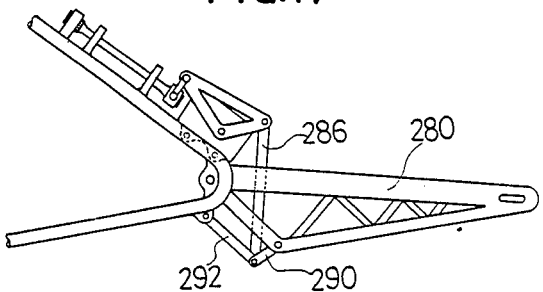
FIG. 17 is a side view of a wheel suspension system according to a tenth embodiment of the invention.

Referring now to FIGS. 15 to 17 showing the eighth to tenth embodiments of the invention in which a progressive linkage is interposed between a rear fork and a link member secured to an operation shaft of a lever type damper, designated by reference numeral 237 in FIG. 15 is a lever type damper having an operation shaft 238. A triangular link member 218 secured at the lower corner thereof to the operation shaft 238 is connected at the upper rear corner thereof by means of a pin 219 with the upper end of a rod 216. The lower end of the rod 216 is connected by means of a common pin 224 with the lower end of a rod 220 having the upper end thereof vertically pivotally connected by a pin 221 with a rear fork 210 as well as the rear end of a rod 222 having the front end thereof vertically pivotally connected by a pin 223 with a vehicle frame 201. When the rear fork 210 swings upwardly about a pivot shaft 211, the link member 218 will be caused through the rod 216 to rotate counterclockwise in FIG. 15 about shaft 238, while the rod 220 which is restricted by the rod 222 to be spaced at a constant distance from the vehicle frame 201 will rotate clockwise in FIG. 15 about the pin 221, thereby causing the amount of rotation of the link member 218 to be increased progressively by that of the rod 220 as the amount of swinging motion of the rear fork 210 becomes large and thus rendering progressive the damping force characteristic due to the damper 237 and the torsion bar 221, to be progressive so that a progressive linkage is defined by the rods 216, 220, 222.

In the ninth embodiment wherein the rod 220 in the eighth embodiment is modified to comprise a triangular rotatable member 260, the rotatable member 260 has the upper front and rear corner thereof connected with a rod 256, the rod 256 being operatively connected with a triangular link member 258, and a rear fork 250, respectively, and has the lowest corner thereof connected with a rod 262 extending rearwardly from a vehicle frame 240.

In the tenth embodiment, shown in FIG. 17, a rear fork 280 is formed as a truss structure directed downwardly, and a progressive linkage is defined by with three rods 286, 290, 292 similar to the eighth embodiment.

Figure 18:
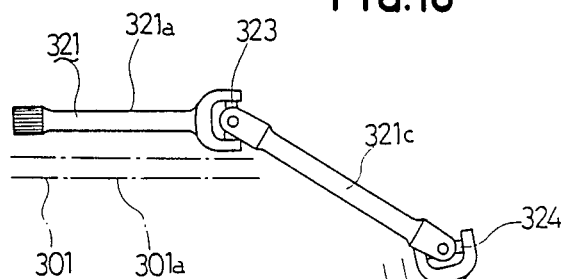
FIG. 18 is an explanatory view showing the connection of a plurality of torsion bars of a wheel suspension system according to an eleventh embodiment of the invention.

Referring now to FIG. 18, generally designated by reference numeral 321 is a torsion bar arranged along a vehicle frame 301 including at least two frame members 301a, 301b which form an angle with each other. The torsion bar 321 comprises two separate bar members 321a, 321b and a rod member 321c interposed therebetween. The bar members 321a, 321b are flexibly connected with the rod member 321c by universal or ball joints 323, 324, respectively.

Figure 19:
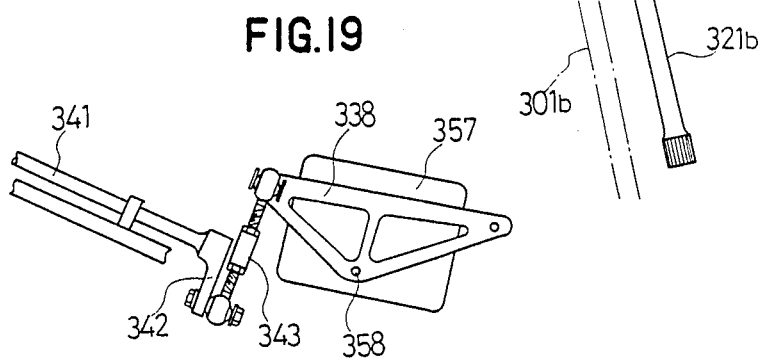
FIG. 19 is a fragmentary side view of a wheel suspension system according to a twelfth embodiment of the invention.

Referring now to FIG. 19, designated by reference numeral 357 is a lever type damper having an operation shaft 358. A link member 338 secured to the operation shaft 358 and a link arm 342 engaged with the rear end of a torsion bar 341 are connected with each other through a turnbuckle which is 343 adjustable in length. By changing the length of the turnbuckle 343, the angles of the link 338 and a rear fork (not shown) relative to a horizontal plane can be changed when a motocycle (not shown) is subjected to a static load, thereby permitting a level adjustment of the motorcycle. Such a level adjustment may be achieved by connecting a rear fork with a link member by means of a turnbuckle type connection member in place of the rod 16 in the first embodiment of the invention for example.

Figure 20:
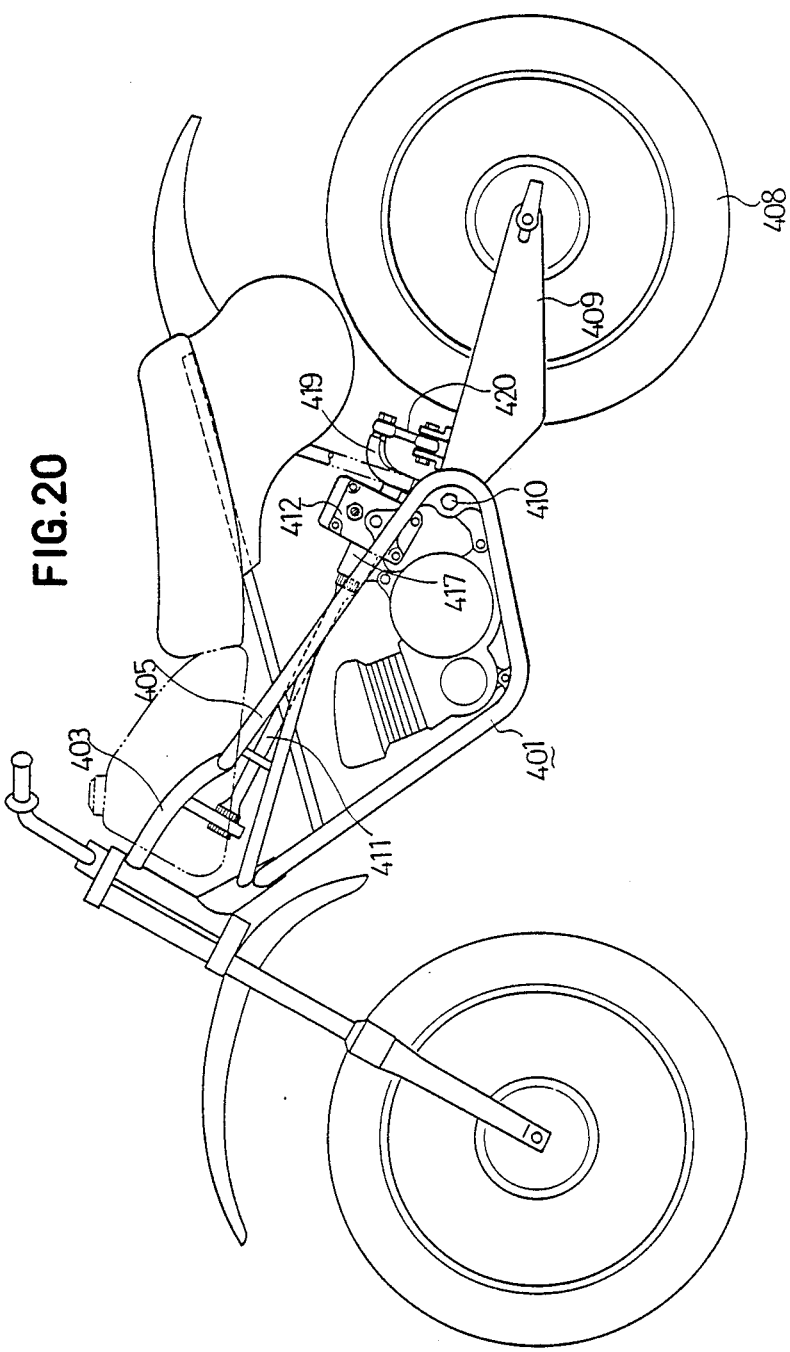
FIG. 20 is a side view of a motorcycle including a wheel suspension system according to a thirteenth embodiment of the invention.
Figure 21:
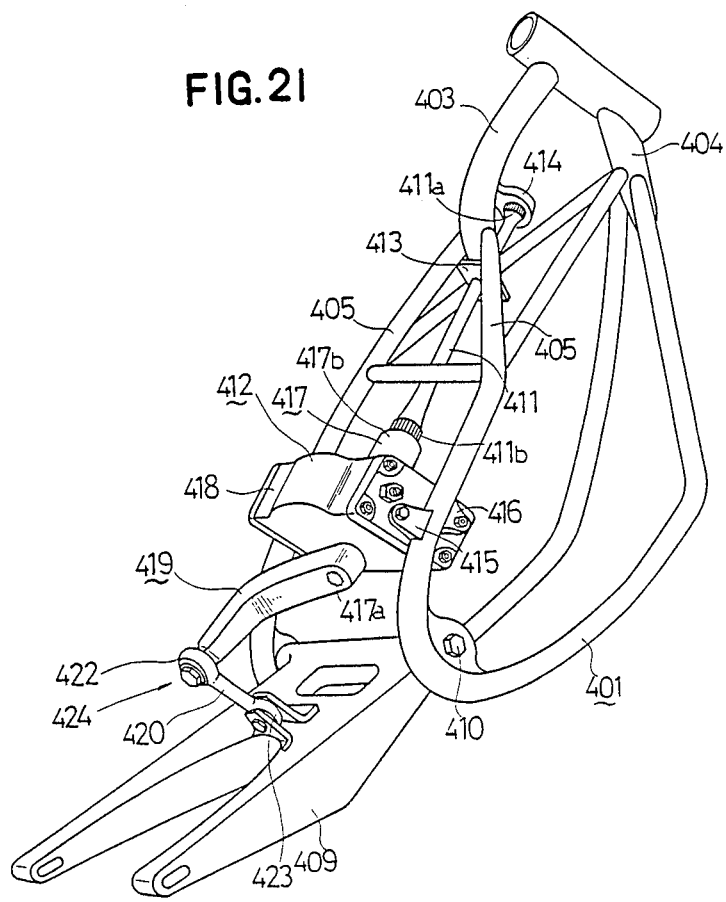
FIG. 21 is an enlarged perspective view of the wheel suspension system of FIG. 20.

Referring now to FIGS. 20 and 21, designated by refrence numeral 411 is a single torsion bar arranged to extend longitudinally between a pair of left and right main frame members 405, 405. The torsion bar 411 is rotatably supported at the intermediate portion thereof by a bracket 413 secured to the rear end of a relatively large diameter frame member 403 and is formed on the front end portion thereof with a serration 411a engaged with an arm 414 integrally secured to the large diameter frame member 403. Between the main frame members 405, 405 there is transversely arranged just behind the torsion bar 411 a lever type damper 412 secured on the left and right to respective upper and lower brackets 415, 416 projecting from the left and right main frame members 405, 405, thus being mounted fixedly on a vehicle frame 401 of the motorcycle. The damper 412 as transversely mounted on the motorcycle is provided therethrough with a damping operation shaft 417 having the axial centerline thereof directed longitudinally. The operation shaft 417 is provided through a body casing 418 of the damper 412 and formed on the rear end portion thereof with a serration 417a a engaged with the front end of a lever 419 having a configuration substantially in the form of an L.

The rear end of the lever 419 is operatively connected through a rod 420 with a rear fork 409 swingable about a pivot shaft 410. In other words, the operation shaft 417 of the lever type damper 412 is operatively connected with the rear fork 409 by means of a linkage 424 comprising the lever 419, the rod 420 and ball joints 422, 423.

The front end of the operation shaft 417 projecting from the casing 418 of the damper 412 is formed as a tubular portion 417b engaged in a male-female serration manner with the rear serration 411b of the torsion bar 411, thereby directly connecting the operation shaft 417 with the torsion bar 411 in series.

Referring now to FIGS. 22 and 23, the inside of the casing 418 of the damper 412 filled with oil is separated into an upper and lower chambers $S_{11}$, $S_{12}$ by a horizontal wall 425 having at the lengthwise or longitudinally central part thereof a bulged portion 425a curved upwardly, the horizontal wall 425 being formed therethrough at the left and right ends thereof with left and right oopenings 425b, 425c. In the lower chamber $S_{12}$ there is slidably fitted a piston 426 having the inner bottom portion thereof formed with a rack 426a. On the other hand, the operation shaft 417 is formed at the central portion thereof with a pinion 417c in engagement with the rack 426a, thereby causing the piston 426 to slide leftwardly and rightwardly in FIG. 22 as the operation shaft 417 rotates.

The upper chamber $S_{11}$ is provided on the left and right with left and right damping force generating mechanisms 427, 428, respectively. The left and right damping force generating mechanisms 427, 428 comprise, respectively as shown in FIG. 22, left and right guide tubes 431, 432 threadedly received in left and right lids 429, 430 of the body casing 418; left and right stoppers formed therethrough with left and right orifices 435, 436 opening to left and right inner paths 433, 434 of the guide tubes 431, 432; left and right disk members 439, 440 as well as left and right pluralities of plate valves 441, 442 slidably fitted on the respective outer circumferences of the guide tubes 431, 432; left and right springs 443, 444 normally exerting their resilient forces inwardly of the chamber $S_{11}$ upon the disk members 439, 440 and the plate valves 441, 442, and left and right needles 447; 448 inserted in the guide tubes 431, 432 so as to have the tapered distal end portions thereof 445, 446 facing the orifices 435, 436. The needles 447, 448 are fitted in the guide tubes 431, 432, respectively, in a threaded engagement manner so as to be capable of respective advance and retreat movements by driving from the outside of the casing 418. The guide tubes 431, 432 are formed with through-holes 449, 450 opening to the inner paths 433, 434, respectively, and the disk members 439, 440 are formed therethrough with orifices 451, 452 closed from the side of the chamber $S_{11}$ with the plate valves 441, 442, respectively.

When the rear fork 409 is caused to swing upwardly about the pivot shaft 410, thereby allowing a rear wheel 408 to move upwardly, the lever 419 will be rotated through the rod 420 about the operation shaft 417, thus causing the operation shaft 417 to rotate concurrently, so that the torsion bar 411 becomes twisted and generates damping forces. With the rotation of the operation shaft 417, the rack 426a will be caused to slide by the pinion 417c.

Providing that the rack 426a slides leftwardly in FIG. 22, the left chamber $S_{13}$ of the lower chamber $S_{12}$ will have oil therein pressed to flow through the oopening 425b, the through-hole 449, the inner path 433 and the orifice 435 into the upper chamber $S_{11}$ and further through the orifice 436, the inner path 434, the through-hole 450 and the opening 425c into the right chamber $S_{14}$ of the lower chamber $S_{12}$, while generating damping forces when passing the orifices 435, 436 which have their open areas reduced with the tapered portions 445, 446 of the needles 447, 448 inserted thereinto.

If the orifice 436 has the open area thereof adjusted to be smaller than that of the orifice 435, the oil chamber $S_{11}$ will have oil pressures therein raised, thus forcing the disk member 440 and the plate valves 442 to retreat opposing the spring 444 until the disk member 440 passes an edge of the opening 425c while permitting oil to enter therethrough into the right chamber $S_{14}$.

Further, where the rear wheel 408 moves upwardly at relatively high speeds, the left chamber $S_{13}$ will have oil pressures therein increased to be relatively large, thus exerting through the orifice 451 upon the plate valves 441, which then yield to deform, thereby admitting the oil of the left chamber $S_{13}$ through both the orifices 435, 451 into the upper chamber $S_{11}$ and causing the oil of the upper chamber $S_{11}$ to enter into the right chamber $S_{14}$ through the opening 425C as the dish member 440 and the plate valves 442 retreat. Consequently, both the orifices 435, 451 admit oil therethrough while generating damping forces in response to the upward movement of the rear wheel 408.

On the contrary, when the rear wheel 408 moves downwardly, the above-mentioned working directions will become vice versa.

Referring now to FIG. 24, designated by reference numeral 479 is a rear fork comprising a base frame member 479a, front and rear inclined sub-frame members 479b, 479c and a plurality of reinforcing frame members 479d interposed between the members 479a and 479c, thereby constituting a truss structure directed downwardly. The rear fork 479 is connected through a rod 489 and a lever 490 with a damping operation shaft 491 of a lever type damper 492, so as to thereby rotate the operation shaft 491 and twist a torsion bar 493 while generating damping forces.

Referring now to FIGS. 25, 26, designated by reference numeral 507 is a damping operation shaft of a lever type damper 502. The operation shaft 507 is comprises an assembly of an input shaft 503 and an output shaft 504 which are arranged to be perpendicular with respect to each other by means of a pair of bevel gears 503a, 504a, thereby permitting a lever 509 engaged with the input shaft 503 to be straight.

Referring now to FIG. 27, designated by reference numeral 539 is a rear fork connected with a lever type damper 512 by means of a lever 519 and a length-adjustable member 520 of a turnbuckle type, thus permitting an adjustment of vehicle height.

Figure 28:
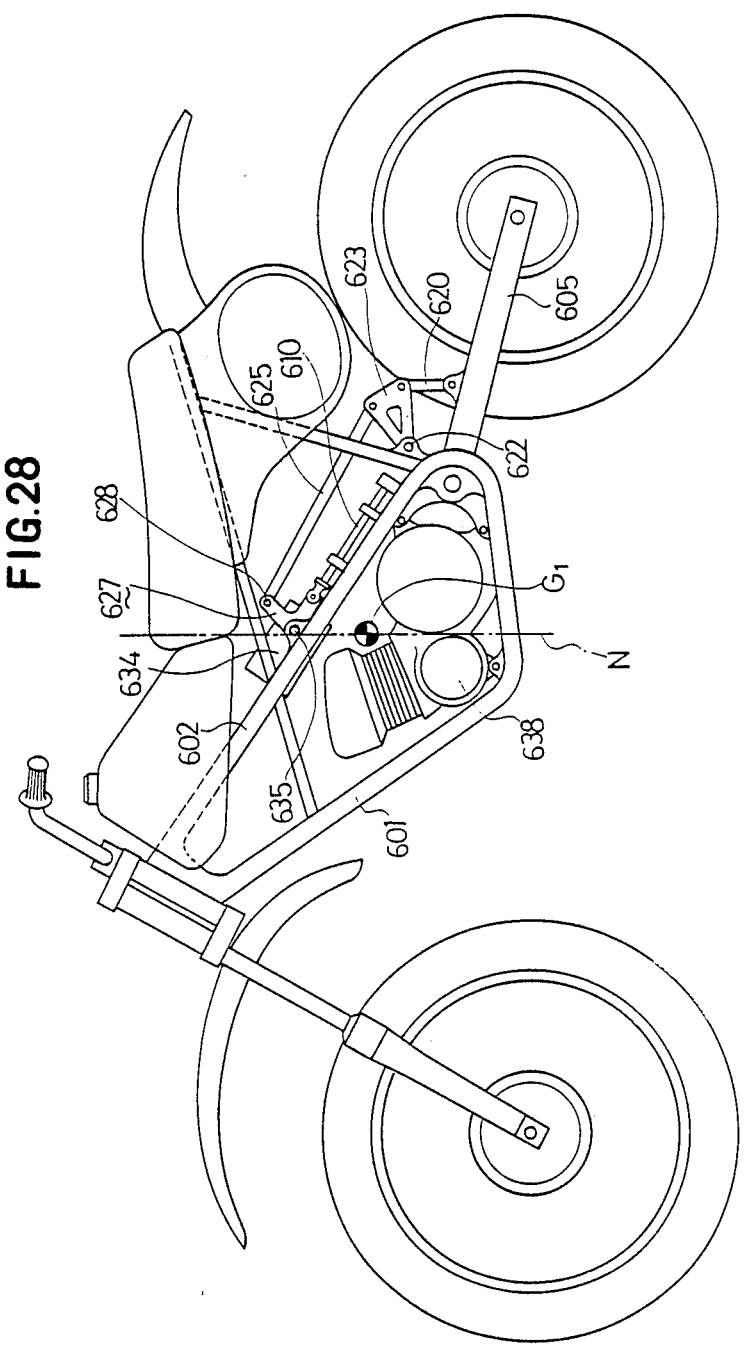
FIG. 28 is a side view of a motorcycle including a wheel suspension system according to a seventeenth embodiment of the invention.
Figure 29:
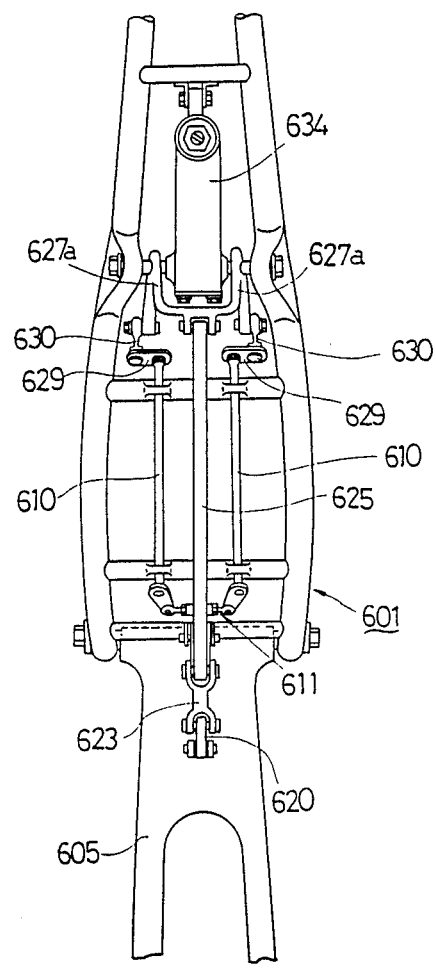
FIG. 29 is an enlarged plan view of the wheel suspension system of FIG. 28.

Referring now to FIGS. 28 and 29, designated by reference numeral 605 is a rear fork connected with the lower end of a rod 620 having the upper end thereof connected with the upper rear corner of a triangular link 623 pivotally connected at the lowest corner thereof with a vehicle frame 601 by a shaft 622. The upper front corner of the link 623 is connected through a rod 625 with the upper end of a link member 627 having a configuration substantially in the form of an L in side elevation. The link member 627 has a pair of forked portions 627a, 627a engaged respectively at the intermediate parts thereof with a damping operation shaft 635 of a lever type damper 634 and connected at the distal ends thereof through a pair of left and right rods 630, 630 and a pair of left and right arms 629, 629 with the front ends of a pair of left and right torsion bars 610, 610, respectively. The torsion bars 610, 610, have the rear ends thereof interconnected by means of a preload adjusting mechanism 611 similar to that as described in the first embodiment of the invention.

Which is shown in FIG. 28, the damper 634 as a relatively heavy member, is disposed ahead of the torsion bars 610, 610 and just above the center of gravity $G_1$ of the motorcycle existing in the vicinity of an engine 638 such that a vertical axis N passing the center of gravity $G_1$, passes the damper 634 also. Thus, the damper 634 is disposed near the center of gravity $G_1$, thereby reducing the moment of inertia of the motorcycle about the center of gravity $G_1$, and permitting the yawing of the motorcycle to be controlled about the vertical axis N.

Referring now to FIG. 30, designated by reference numeral 670 is a torsion bar disposed along a down-tube 663 of a vehicle frame 661, while a lever type damper 694 is fixed to the lower part of a bottom frame 667. The torsion bar 670 is connected with a rear fork 665 through a force transmission route including a rod 680, a swingable link 683, a rod 685, a link member 687 and a rod 690. In this embodiment, because it is disposed at the lower part of the vehicle frame 661, the damper 694 is preferably arranged near the center of gravity $G_2$ of the motorcycle. Further, a vertical axis $N_2$ passing the center of gravity $G_2$ passes the damper 694.

Figure 32:
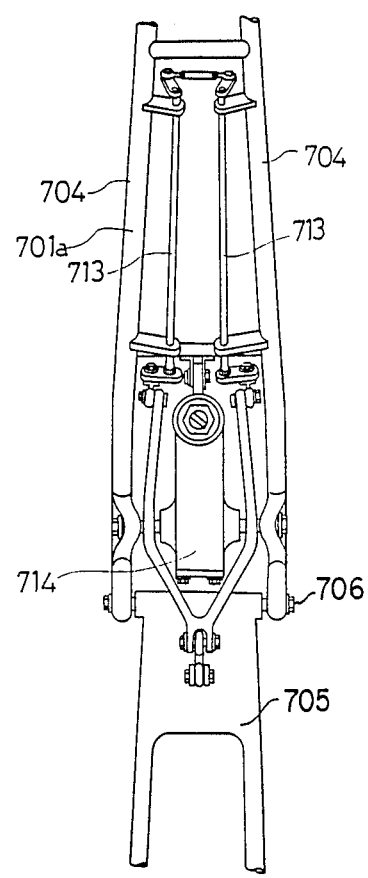
FIG. 32 is an enlarged bottom view of the wheel suspension system of FIG. 31.
Figure 33:
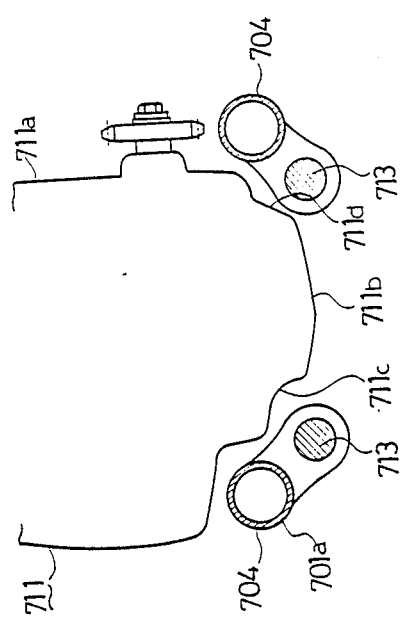
FIG. 33 is an explanatory view showing the positional relation between a pair of torsion bars of the wheel suspension system and an engine of the motorcycle of FIG. 31.

Referring now to FIGS. 31 to 33, designated by reference numeral 713 is a pair of torsion bars arranged together with a lever type damper 714 arranged at the lower surface of left and right bottom portions 701a, 701a of a vehicle frame 701, the rear parts of said bottom portions 701a, 701a being connected with rear fork 705 by means of a pivot shaft 706 to permit swinging of rear fork 705 (FIG. 32). Therefore, as shown in FIG. 31, a relatively large space S is obtainable between left and right main frames 702, 702 and a driver's seat 737. An engine 711 has a transmission casing 711a with the lower portion thereof 711b bulged to project downwardly between left and right bottom frame members 704, 704, and the torsion bars 713, 713 are disposed to be fitted along respective recessed portions 711c, 711d formed on the left and right sides of the bulged lower portion 711b, thus being assembled to the bottom frames 704, 704, thereby rendering relatively small the amount of downward projection of the torsion bars 713, 713 from the bottom portions 701a, 701a of the vehicle frame 701.

Figure 34:
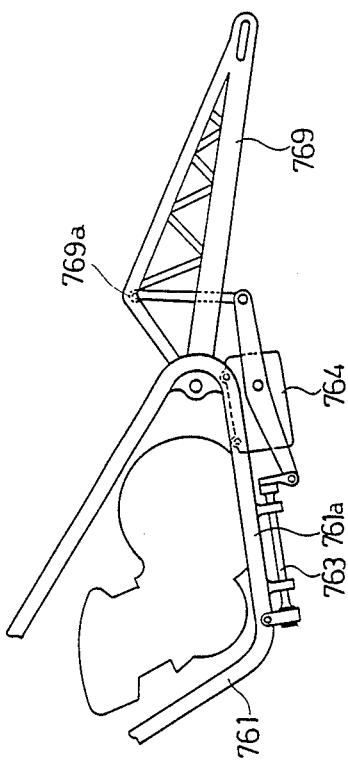
FIG. 34 is a side view showing a wheel suspension system according to a twentieth embodiment of the invention and an engine of a motorcycle including the wheel suspension system.
Figure 35:
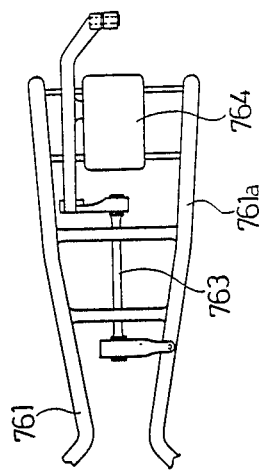
FIG. 35 is a fragmentary bottom view of the wheel suspension system of FIG. 34.

Referring now to FIGS. 34 and 35 designated by reference numeral 769 is a rear fork having a truss structure directed upwardly. The rear fork 769 has the top portion 769a thereof connected with a torsion bar 763 arranged together with a lever type damper 764 at a bottom portion 761a of vehicle frame 761 similar to the embodiment of the invention shown in FIGS. 31-33, while the torsion bar 763 is provided as a single member.

Figure 36:
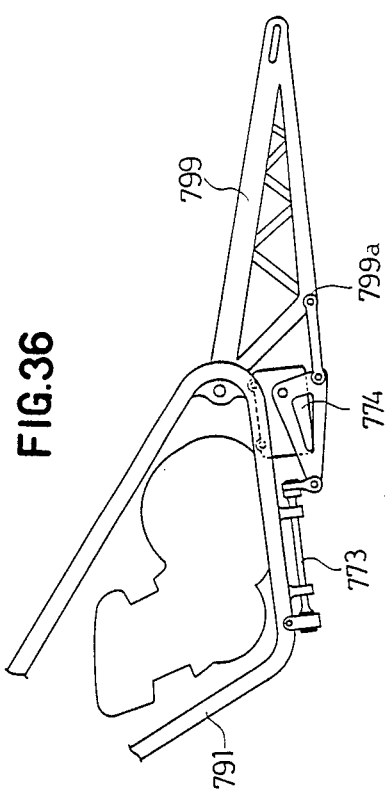
FIG. 36 is a side view showing a wheel suspension system according to a twenty-first embodiment of the invention and an engine of a motorcycle including the wheel suspension system.

Referring now to FIG. 36, designated by reference numeral 799 is a rear fork having a truss structure directly downwardly. The rear fork has the top portion 799a thereof connected with a torsion bar 773 arranged together with a lever type damper 774 under a vehicle body 791.

Figure 39:
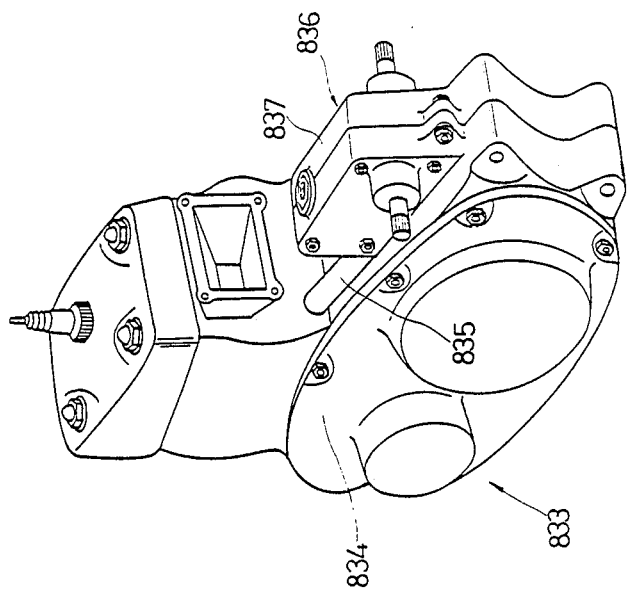
FIG. 39 is an enlarged perspective view of the engine of the motorcycle of FIG. 37.
Figure 38:
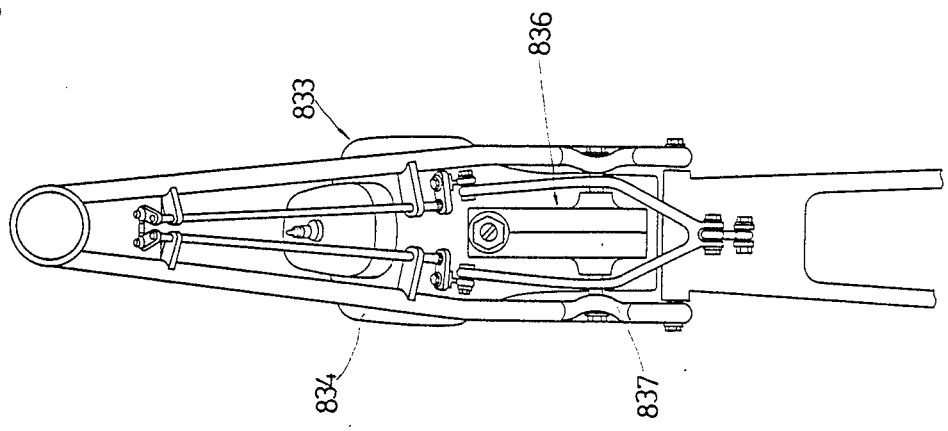
FIG. 38 is an enlarged bottom view of the wheel suspension system of FIG. 37.

Referring now to FIGS. 37 to 39, designated by reference numeral 833 is an engine having a casing 834 formed on the rear upper portion thereof with a casing 837 of a lever type damper 836 to which cooling water of the engine 833 is supplied through a tube member 835, thereby effectively preventing the damper 836 from overheating. The damper 836 has substantially the same structure as damper 37 shown in FIG. 6, and is substantially entirely enclosed within the damper casing 837.

Figure 41:
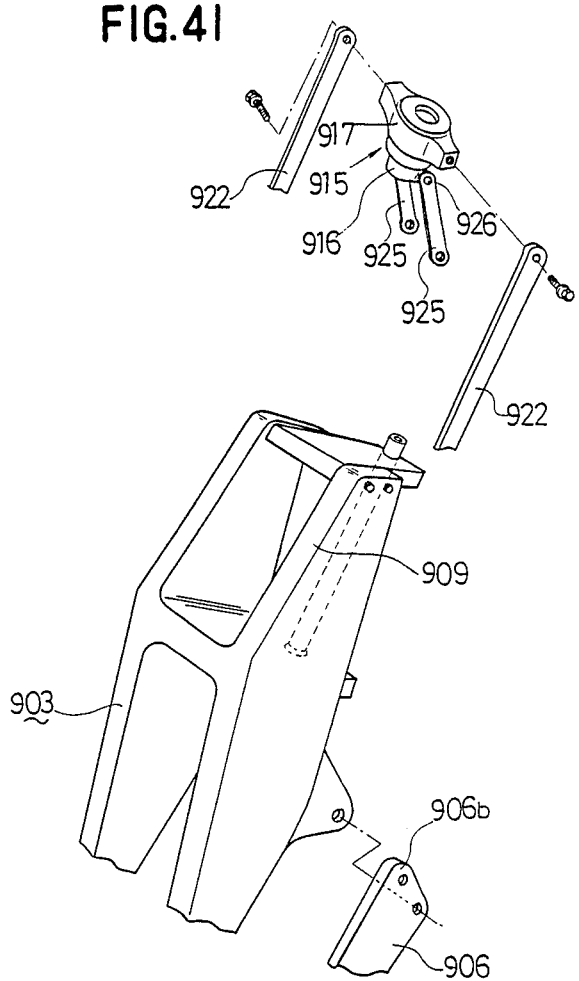
FIG. 41 is an exploded enlarged fragmentary view of the wheel suspension system of FIG. 40.
Figure 42:
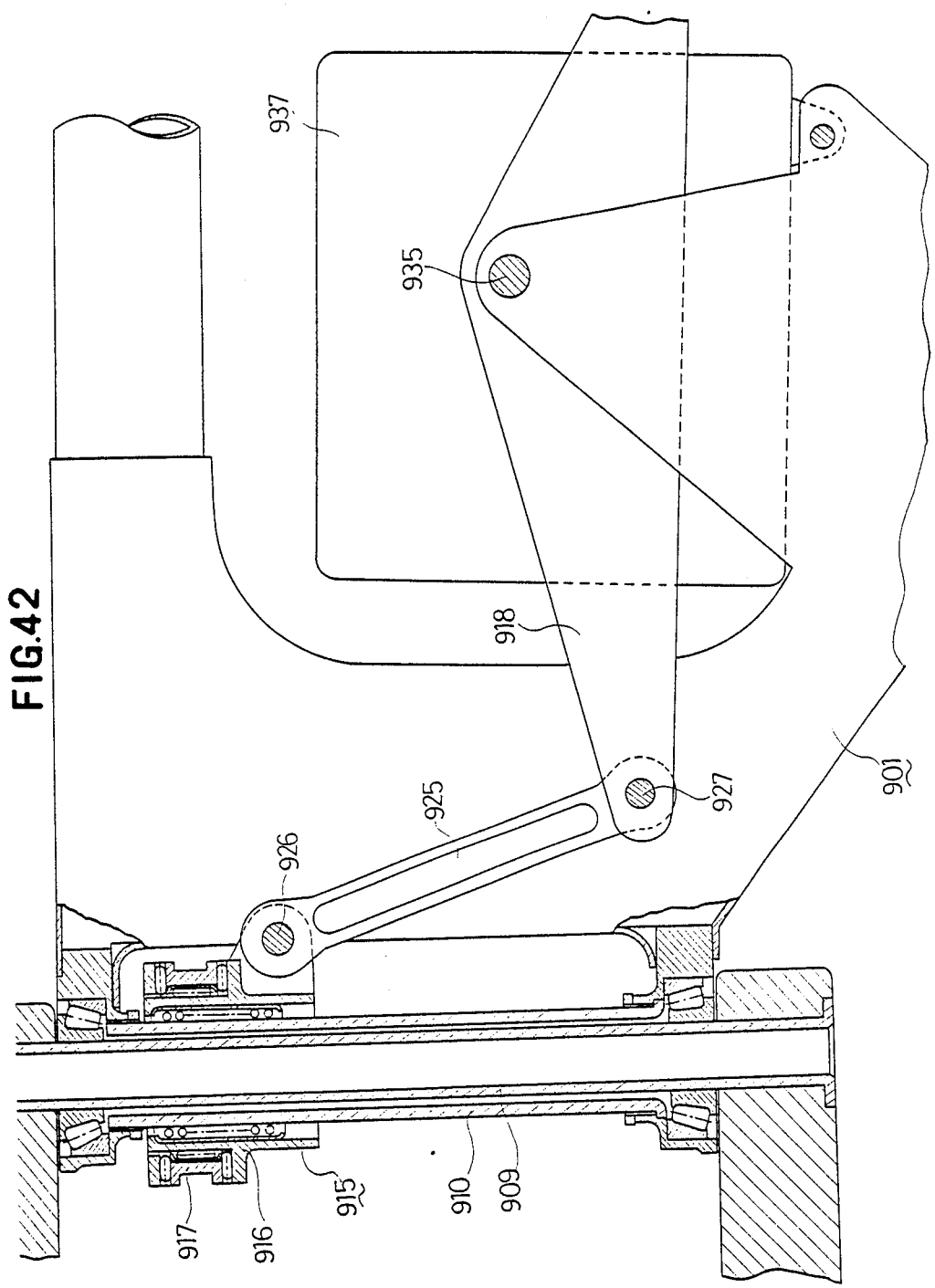
FIG. 42 is an enlarged fragmentary sectional view of the wheel suspension system of FIG. 40.

Referring now to FIGS. 40 to 42, designated at 913 is a pair of left and right quadrilateral linkages comprising an upper fork 903 transversely rotatably jointed to a vehicle frame 901, a lower fork 904 supporting thereon a front wheel 912, and front and rear arms 905, 906 connecting the upper and lower forks 903, 904 with each other.

The rear arm 906 is pivotally connected at the upper portion thereof through a pin 906a with the upper fork 903 and at the distal end of the upwardly projecting protion 906b thereof with the lower end of a rod 922.

The paired linkages 913, 913 have the respective rods 922, 922 extending along the upper fork 903 and pivotally connected at the upper ends thereof with either side of a ring member 917 defining together with a ball bearing 916 a force transmission mechanism 915.

The ring member 917 is rotatably fitted on the ball bearing 916 which is in turn rotatably fitted on a head tube 910 of the frame 901 which is in turn rotatably fitted on a stem shaft 909 secured to the upper fork 903. On either lateral side of the bearing 916 and extending downwardly is a pair of rods 925, 925 pivotably connected at the uppwer ends thereof with the bearing 916.

The paired rods 925, 925 are connected at the lower ends thereof by a pin 927 with the front end of a link member 918 engaged at the intermediate portion thereof with an operation shaft 935 of a lever type damper 937. The rear end of the link member 918 is connected through a link motion arrangement 934 with a torsion bar 921 disposed in a main frame 914 of the vehicle frame 901.

Figure 43:
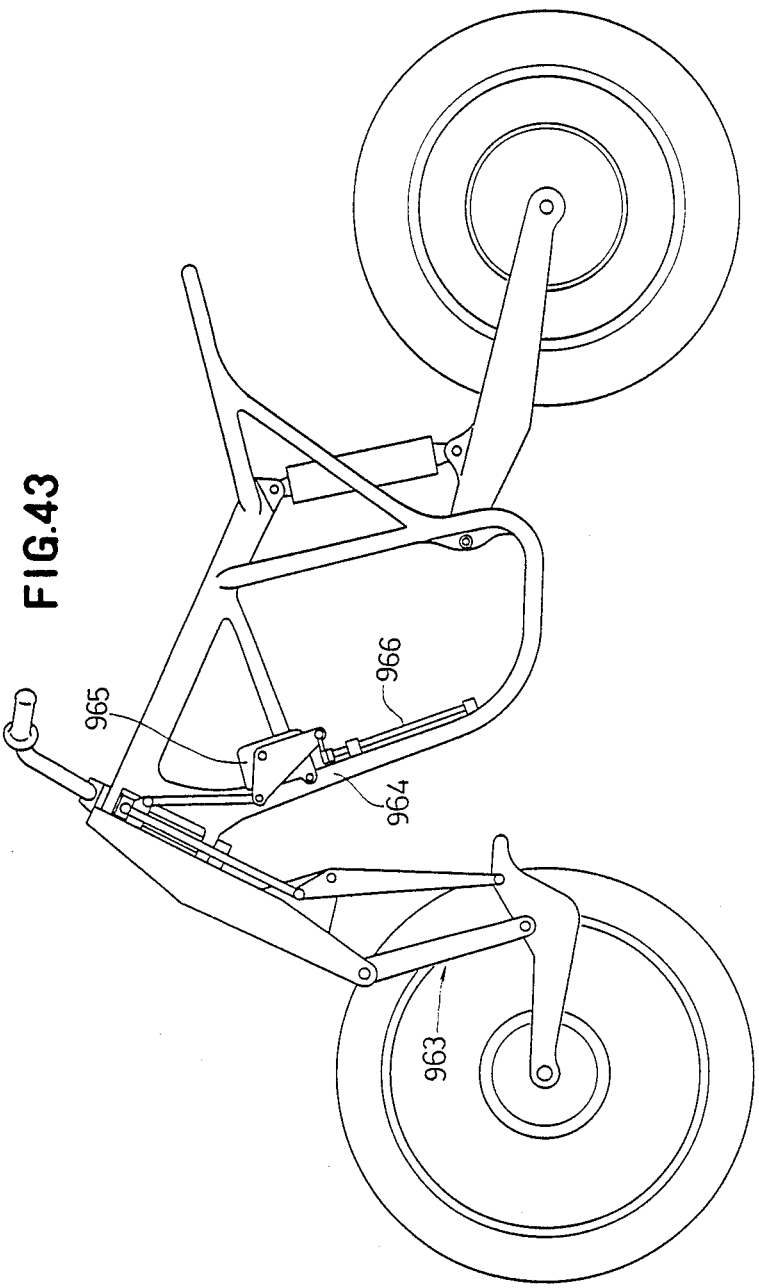
FIG. 43 is a side view of a motorcycle including a wheel suspension system according to a twenty-fourth embodiment of the invention.

Referring now to FIG. 43, a quadrilateral linkage 963 is connected with a lever type damper 965 and a torsion bar 966, both being disposed along a down-tube 964.

Figure 44:
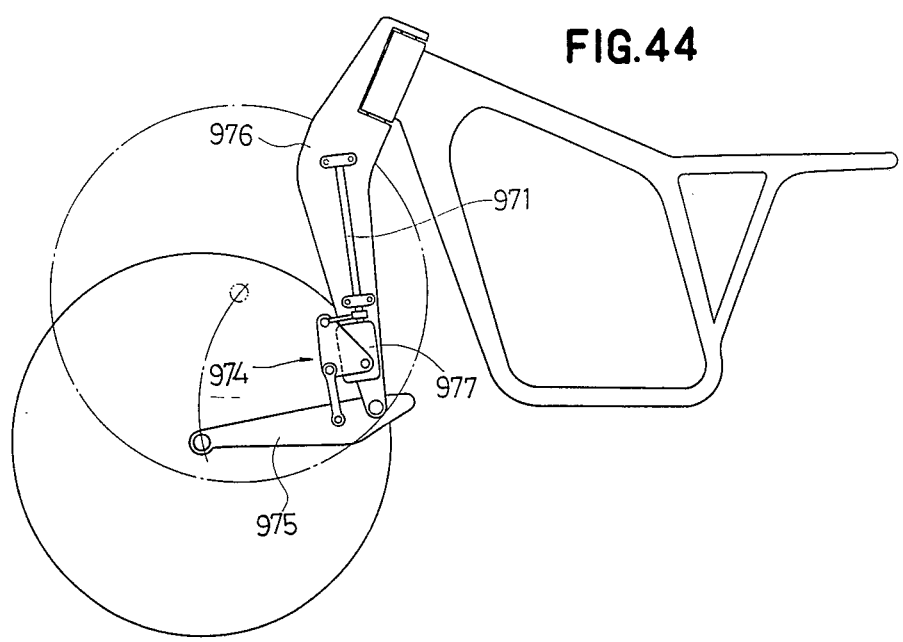
FIG. 44 is an explanatory side view showing a wheel suspension system according to a twenty-fifth embodiment of the invention.
Figure 45:
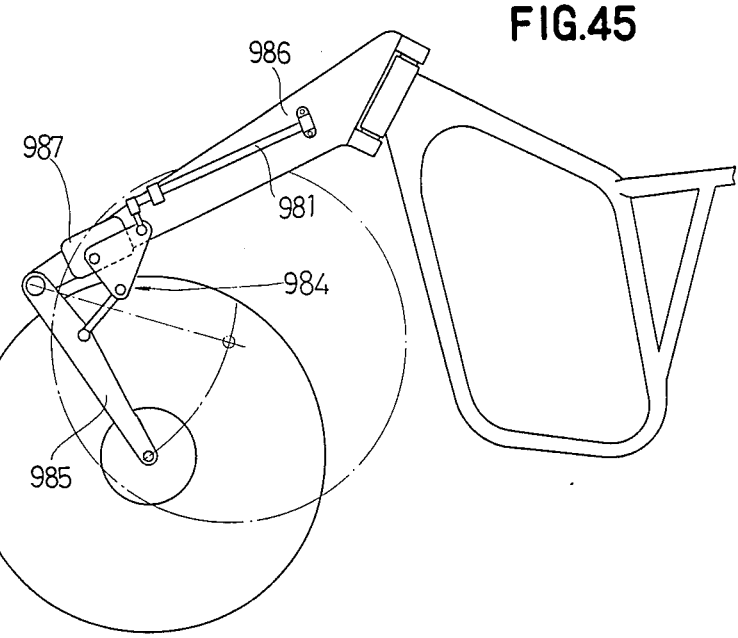
FIG. 45 is an explanatory side view showing a wheel suspension system according to a twenty-sixth embodiment of the invention.

Referring now to FIGS. 44 and 45 showing front suspension systems of a leading type and a trailing type, respectively, torsion bars 971, 981 and lever type dampers 977, 987 are both disposed along upper forks 976, 986 and connected through link motion 974, 984 with lower forks 975, 985.

What is claimed is:

1. A wheel suspension system for a motorcycle including a relatively stable member and a swingable member swingably connected with said stable member, said swingable member supporting thereon a road wheel, comprising:
- at least one torsion bar arranged on said stable member;
- a linkage operably connected between said swingable member and said torsion bar so as to transmit forces therebetween;
- a lever type damper including a casing having damping force generating means disposed therein, and a rotatable operation shaft operably connected with said damping force generating means so as to be rotatable in both opposite rotating directions to operate said damping force generating means;
- said casing of said damping being fixedly mounted on said stable member in stationary relation thereto;
- said operation shaft being engaged with said linkage;
- said motorcycle including a vehicle frame;
- said stable member comprising a bottom portion of said vehicle frame;
- said bottom portion having mounted thereon an engine of said motorcycle;
- said torsion bar being supported by said bottom portion so as to be disposed longitudinally beneath said bottom portion and said engine; and
- said damper being disposed beneath said bottom portion and rearwardly of said torsion bar.

2. A suspension system according to claim 1, wherein: said swingable member is swingably connected with a part of said bottom portion; and said damper is disposed under said part of said bottom portion.

3. A suspension system for a motorcycle including a relatively stable member and a swingable member swingably connected with said stable member, said swingable member supporting thereon a road wheel, comprising:
- at least one torsion bar arranged on said stable member;
- a linkage operably connected between said swingable member and said torsion bar so as to transmit forces therebetween;
- a lever type damper including a casing having damping force generating means disposed therein, and a rotatable operation shaft operably connected with said damping force generating means so as to be rotatable in both opposite rotating directions to operate said damping force generating means;
- said operation shaft being engaged with said linkage;
- said damper casing enclosing substantially the entirety of said damper; and
- said damper casing forming a part of an engine casing of an engine of said motorcycle.

* * * * *

UNITED STATES PATENT AND TRADEMARK OFFICE
CERTIFICATE OF CORRECTION

PATENT NO. : 4,744,434　　　　　　　　　　　　　　Page 1 of 3

DATED　　　: May 17, 1988

INVENTOR(S) : Miyakoshi et al.

It is certified that error appears in the above-identified patent and that said Letters Patent is hereby corrected as shown below:

Column 1, line 27, change "confriguration" to --configuration--.

Column 2, line 10, after "lever" insert --type--.

Column 3, line 20, after "Fig. 37 is" insert --a--.

Column 4, line 44, after "Figs. 1" change "and" to --to--.

Column 5, line 7, change "memberss" to --members--;
　　　　　　line 31, change "extered" to --exerted--;
　　　　　　line 42, change "with" to --by means of--.

Column 6, line 11, change "value" to --valve--;
　　　　　　line 13, change "its" to --the--;
　　　　　　line 19, change "$S_6 S_7$" to --$S_1$--;
　　　　　　change "S6, S7" to --$S_6$, $S_7$--;
　　　　　　line 22, change "valuve" to --valve--;
　　　　　　line 53, delete "before";
　　　　　　delete "men-";
　　　　　　line 54, delete "tioned";
　　　　　　line 61, delete "where".

UNITED STATES PATENT AND TRADEMARK OFFICE
CERTIFICATE OF CORRECTION

PATENT NO. : 4,744,434

DATED : May 17, 1988

INVENTOR(S) : Miyakoshi et al.

It is certified that error appears in the above-identified patent and that said Letters Patent is hereby corrected as shown below:

```
Column 7, line 6, before "58b" delete "thereof";
          line 18, after "position" change "on" to
--of--;
          line 23, after "oil" insert --pressure--;
          line 36, change "is to rotate" to --rotates--.
Column 8, line 6, change "linkk" to --link--.
Column 9, line 18, change "numberal" to --numeral--;
          line 43, change "havving" to --having--.
Column 10, line 20, delete"progressive";
           line 35, delete "with";
     Column 10, line 52, change "which is 343" to --343
which is--;
           line 55, change "motocycle" to --motorcycle--;
           line 63, change "refrence" to --reference--.
Column 11, line 15, after "417a" delete "a";
Column 11, line 38, change "oopenings" to
     --openings--.
Column 12, line 17, change "oopening" to
     --opening--;
           line 63, after "507" delete "is".
```

UNITED STATES PATENT AND TRADEMARK OFFICE
CERTIFICATE OF CORRECTION

PATENT NO. : 4,744,434

DATED : May 17, 1988

INVENTOR(S) : Miyakoshi et al.

It is certified that error appears in the above-identified patent and that said Letters Patent is hereby corrected as shown below:

Column 13, line 26, change "Which is" to --As--;
    change "634 as" to --634, which is--.
Column 14, line 14, change "rectly" to --rected--;
    line 38, change "protion" to --portion--;
    line 50, change "uppwer" to --upper--;
    line 66, after "motion" insert
--arrangements--.
Column 15, line 18 (Claim 1, line 17), change
"damping" to --damper--.

Signed and Sealed this

Thirteenth Day of December, 1988

Attest:

DONALD J. QUIGG

Attesting Officer     Commissioner of Patents and Trademarks